United States Patent
Lakrout et al.

(10) Patent No.: US 10,907,056 B2
(45) Date of Patent: Feb. 2, 2021

(54) CURABLE COMPOSITIONS

(71) Applicant: BLUE CUBE IP LLC, Midland, MI (US)

(72) Inventors: Hamed Lakrout, Midland, MI (US); Katherine Clement, Midland, MI (US); Maurice J. Marks, Midland, MI (US)

(73) Assignee: Blue Cube IP LLC, St. Louis, MO (US)

( * ) Notice: Subject to any disclaimer, the term of this patent is extended or adjusted under 35 U.S.C. 154(b) by 645 days.

(21) Appl. No.: 15/558,823

(22) PCT Filed: Mar. 17, 2016

(86) PCT No.: PCT/US2016/022761
§ 371 (c)(1),
(2) Date: Jan. 5, 2018

(87) PCT Pub. No.: WO2016/153894
PCT Pub. Date: Sep. 29, 2016

(65) Prior Publication Data
US 2018/0100076 A1     Apr. 12, 2018

Related U.S. Application Data

(60) Provisional application No. 62/135,747, filed on Mar. 20, 2015.

(51) Int. Cl.
| | | |
|---|---|---|
| *C09D 11/101* | (2014.01) | |
| *C09D 4/00* | (2006.01) | |
| *C09D 11/322* | (2014.01) | |
| *C08G 59/24* | (2006.01) | |
| *C08G 59/42* | (2006.01) | |
| *C08L 63/10* | (2006.01) | |
| *C09D 11/38* | (2014.01) | |

(52) U.S. Cl.
CPC ............ *C09D 11/101* (2013.01); *C08G 59/24* (2013.01); *C08G 59/4215* (2013.01); *C08L 63/10* (2013.01); *C09D 4/00* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/2141; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2202/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 2008/0045618 A1* | 2/2008 | Nagvekar | C08F 290/06 522/27 |
| 2009/0053431 A1* | 2/2009 | Koenig | B41M 5/0011 428/32.3 |
| 2011/0319515 A1* | 12/2011 | Carter | C08G 59/22 522/55 |
| 2013/0090407 A1* | 4/2013 | Carter | C09D 11/101 522/170 |
| 2015/0087749 A1* | 3/2015 | Marks | C08G 59/245 523/400 |

* cited by examiner

*Primary Examiner* — Manish S Shah
(74) *Attorney, Agent, or Firm* — Husch Blackwell LLP

(57) ABSTRACT

A low viscosity energy curable epoxy resin composition essentially free of solvent for preparing an ink composition comprising: (a) at least one divinylarene dioxide compound, (b) at least one cycloaliphatic epoxy resin, (c) at least one vinyl ether compound, (d) at least one cationic photoinitiator, (e) at least one pigment, and (f) optionally, at least one oxetane; wherein (i) the viscosity of the curable composition is less than or equal to about 50 mPa·s at 25° C., (ii) the composition cures at a relative humidity of greater than 30%, and (iii) the composition cures with an increase in cure time of less than 100% when the composition is cured at a relative humidity of at least 70% compared to that of a composition that is cured at a relative humidity of less than or equal to 45%. The curable epoxy resin composition is useful, for example, for preparing an ink composition; and more specifically for preparing a solventless low viscosity UV curable inkjet ink composition.

20 Claims, No Drawings

CURABLE COMPOSITIONS

FIELD OF THE INVENTION

The present disclosure generally relates to a low viscosity curable epoxy resin composition. The curable compositions of the present invention can be useful for photosensitive inkjet ink applications and coatings.

BACKGROUND OF THE INVENTION

Compositions based on a divinylarene dioxide, a cationic photoinitiator, and a pigment have been described in the prior art and are known to be useful for ink applications. However, a formulation consisting of a divinylarene dioxide, a photoinitiator, and a pigment without other additives may be too brittle to be used as an ink composition and does not exhibit a suitable viscosity (less than 50 mPa·s and preferably less than 10 mPa·s).

Formulating an epoxy-based inkjet ink having a low viscosity as known in the art is not a trivial matter. For example, U.S. Pat. No. 5,889,084 discloses an ink composition comprising epoxy monomers and oligomers having a viscosity in the range of 1-500 cps at 25° C. and teaches a ink formulations having a viscosity of 1-25 cps at 25° C. Generally, when photopolymerizable monomers have a viscosity greater than 50 cps, the monomers are diluted with either a low viscosity co-reactant (e.g. an alcohol), a low viscosity carrier (e.g. plasticizer), or a solvent (e.g. an alcohol or a ketone) to achieve a workable viscosity which would be usable in a variety of ink jet printers. Solvents are not preferred in ink jet formulations since the solvents need to be evaporated before the ink sets and release volatile organic compounds into the atmosphere. Therefore, an essentially solvent free ink or ink formulation would be advantageous in the industry because it can be processed through a wide range of inkjet print heads.

One known method in the art to reduce the viscosity cationic ink formulation is to add oxetanes. In some cationic ink compositions containing divinylarene dioxides, the addition of an oxetane can reduce the viscosity of the cationic ink formulation and enhance the cure speed of the composition. In increasing humid conditions, the cure speeds of the oxetane-epoxide mixture systems are known to be slow. In even higher humidity environments, the cure rate of these oxetane-epoxide mixtures is significantly reduced which leads to smearing and smudging of the ink. In order to prevent cure speed inhibition, the ink is subjected to a controlled, low humidity environment which maintains the cure speed. The curing speed inhibition of cationic inks due to sensitivity to moisture has been described by Hupfield et al., The Effect of Moisture on the Cationic Polymerization, Radtech, 1998. In these systems, water can act as a chain transfer agent in the curing mechanism. Ambient moisture is typically in the range of 15% relative humidity (RH) to 85% RH. As humidity levels increase above 15% RH, the humidity can affect the rate of cationic polymerization of cationic ink compositions. The effect of ambient moisture on the rate of cationic polymerization is dependent on the monomer type, monomer concentration, the coating permeability, coating thickness, and water concentration. The tendency for rapid inhibition (e.g., more than 20% decrease in yield defined as the ratio of cured versus uncured monomer, for a given ultraviolet light (UV) radiation exposure with an increase of 50 ppm of water content) is a known problem. This problem is evidenced by the incorporation into printers of mechanical drying devices such as infrared (IR) driers or by blanketing the printing area with a dry gas. As an example, U.S. Pat. No. 7,131,722 B2 describes an ink jet printer for cationic UV inks which incorporates a humidity detector and a controller for controlling the amount of the light to be irradiated from the UV light irradiation section on the basis of the detected humidity. Therefore, an oxetane formulated cationic ink that is not significantly inhibited by moisture would be advantageous.

Another possible method to reduce the effects of ambient moisture is to ensure that the ring-opening of epoxide is significantly faster (e.g., same amount of UV radiation energy would result in an increase of the yield by more than 20%) than the reaction between acid and water during curing. Tomotake et al., Konica Minolta, 2008, discloses that epoxides with a higher ring-opening rate show better curing behavior when mixed with oxetanes in the range of 20%-50% RH environment. But, the cure rate of such formulations is slowed as the humidity increases from 20% to 50% relative humidity and above. Therefore, a cationic ink whose cure rate is not significantly inhibited by moisture is needed.

SUMMARY OF THE INVENTION

Disclosed herein are low viscosity, essentially solvent-free, energy curable epoxy resin compositions and methods of preparing and curing these compositions on an article. These compositions are useful as inks.

In one aspect, the low viscosity, essentially solvent-free, energy curable epoxy resin compositions comprise: (a) at least one divinylarene dioxide compound, (b) at least one cycloaliphatic epoxy resin, (c) at least one vinyl ether compound, (d) at least one cationic photoinitiator, and (e) at least colorant compound; wherein the viscosity of the curable composition is less than or equal to about 50 mPa·s at 25° C.

In another aspect, disclosed herein are cured products prepared by curing the low viscosity, essentially solvent free, energy curable epoxy resin compositions.

In a further aspect, disclosed herein are processes for preparing low viscosity, essentially solvent free, energy curable epoxy resin compositions. The processes comprise admixing (a) at least one divinylarene dioxide compound, (b) at least one cycloaliphatic epoxy resin, (c) at least one vinyl ether compound, (d) at least one cationic photoinitiator, (e) at least one pigment, and (f) optionally at least one oxetane. Other additives known to those skilled in the art may also be added.

Also disclosed are processes of curing the epoxy resin compositions. The processes comprise applying the epoxy resin composition to an article and then exposing the epoxy resin composition to a curing energy source to form a cured product.

Other features and iterations of the invention are described in more detail below.

DETAILED DESCRIPTION OF THE INVENTION

As previously mentioned, disclosed herein are low viscosity, essentially solvent free, energy curable epoxy resin compositions comprising (a) at least one divinylarene dioxide, (b) at least one cycloaliphatic epoxy resin, (c) at least one vinyl ether compound, (d) at least one cationic photoinitiator, and (e) at least one pigment. These epoxy resin compositions provide many beneficial attributes such as low viscosity, increased pigment content, and the ability to cure in high humidity conditions. After the epoxy resin compositions are applied and cured, the resulting coating provides improved traits such as adhesion to the substrate, water resistance, corrosion resistance, smear resistance, and vibrant color.

(I) Low Viscosity Energy Curable Epoxy Resin Compositions

In one aspect, the low viscosity epoxy resin compositions are free of solvent. In general, the low viscosity epoxy resin composition is a curable composition.

(a) Divinylbenzene Dioxide Compound

The divinylarene dioxide compound, component (a), useful in the present invention of the curable epoxy resin composition comprises at least one divinylarene dioxide compound. The divinylarene dioxide may include, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, tetrahydronaphthalene, and the like. Homologously bonded (substituted) benzenes may consist of biphenyl, diphenylether, and the like. Non limiting examples of divinylarene dioxide may include one or more substituted divinylbenzene dioxide, divinylnaphthalene dioxide, divinylbiphenyl dioxide, divinyldiphenylether dioxide, and mixtures thereof. In one preferred embodiment, the divinylarene dioxide compound may be a divinylbenzene dioxide (DVBDO). In another embodiment, the curable formulation may include two or more conventional epoxy resin compounds wherein at least one of the epoxy resin compounds is a divinylarene dioxide compound. For example, the divinylarene dioxide useful in the curable epoxy resin composition of the present invention may include any of the divinylarene dioxides described in U.S. Pat. No. 8,497,387.

Examples of the divinylarene dioxides that may be used for preparing the formulations disclosed herein include Structures I-IV:

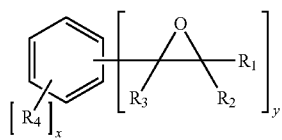

Structure I

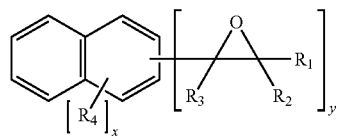

Structure II

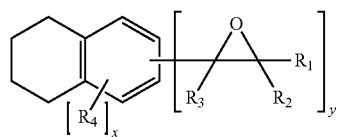

Structure III

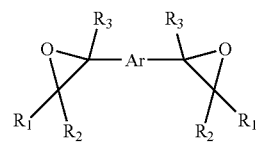

Structure IV

In the above Structures, each $R_1$, $R_2$, $R_3$ and $R_4$ may independently be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, $R_4$ may be a reactive group(s) including epoxide, isocyanate, or any reactive group and Z can be an integer from 0 to 6 depending on the substitution pattern.

In one embodiment, the divinylarene dioxide useful in the present invention may be produced, for example, by the process described in U.S. Pat. No. 8,497,387, by Marks et al., incorporated herein by reference. In another embodiment, the divinylarene dioxides useful in the present invention are disclosed in, for example, U.S. Pat. No. 2,924,580, incorporated herein by reference.

In one preferred embodiment of the present invention, the divinylarene dioxide comprises DVBDO, which has a relatively low liquid viscosity and a higher rigidity and crosslink density than conventional epoxy resins.

DVBDO may be illustrated by Structure V:

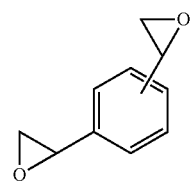

Structure V

The chemical formula of the above DVBDO compound may be as follows: $C_{10}H_{10}O_2$; the molecular weight of the DVBDO is 162.2; and the elemental analysis of the DVBDO is: C, 74.06; H, 6.21; and O, 19.73 with an epoxide equivalent weight of 81 g/mol.

Structure VI below illustrates the meta isomer of DVBDO which may be used in the disclosed resins:

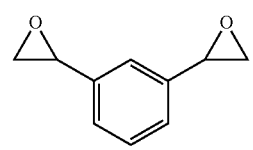

Structure VI

Structure VII below illustrates the para isomer of DVBDO, which may be used in the disclosed resins:

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment, the divinylarene dioxide may contain quantities (such as for example less than 20 wt %) of substituted arenes and/or arene oxides. The amount and structure of the substituted arenes and/or arene oxides mixed with a divinylarene dioxide composition depends on the process used in the preparation of the divinylarene precursor which is used to prepare the divinylarene dioxide. For example, the divinylarene precursor such as divinylbenzene (DVB) may be prepared by the dehydrogenation of diethylbenzene (DEB), and the resultant product composition may contain quantities of ethylvinylbenzene (EVB) and DEB. During the dehydrogenation reaction of DEB, wherein an oxidant such as hydrogen peroxide is utilized, the EVB present in the reaction mixture may react with hydrogen peroxide to produce ethylvinylbenzene oxide while DEB remains unchanged. The presence of ethylvinylbenzene oxide and DEB in the divinylarene dioxide can increase the epoxide equivalent weight of the divinylarene dioxide to a value greater than that of a pure divinylarene dioxide compound.

In one embodiment, the divinylarene dioxide, (for example DVBDO) may comprise a low viscosity liquid epoxy resin. The viscosity of the divinylarene dioxide used may range from 0.001 Pa-s to about 0.1 Pa-s. In various embodiments, the viscosity of the divinylarene dioxide may range from 0.001 Pa-s to about 0.1 Pa-s, from 0.005 Pa-s to about 0.05 Pa-s, and from 0.01 Pa-s to about 0.025 Pa-s at 25° C.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

Generally, the amount of the at least one divinylarene dioxide compound used in the curable composition may range from 1 wt % to about 96 wt % of the total composition.

In various embodiments, the amount of the at least one divinylarene dioxide may range from 1 wt % to about 96 wt %, from 2 wt % to about 95 wt %, from 5 wt % to about 90 wt %, from 10 wt % to about 85 wt %, or from 20 wt % to about 80 wt % based on the total weight of the curable composition. When the amount of the at least one divinylarene dioxide is below 1 wt %, the reactivity of the formulation would be too slow. When the amount of the divinylarene dioxide is above the 96 wt %, the cost of the epoxy resin would be prohibitive.

(b) Cycloaliphatic Epoxy Resin

In general, the cycloaliphatic epoxy resin, component (b), useful in the present invention comprises one or more cycloaliphatic epoxy resin compounds known in the art. Non-limiting examples of cycloaliphatic epoxy resin may include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxide; limonene diepoxide; bis(3,4-epoxycyclohexylmethyl)pimelate; dicyclopentadiene diepoxide; and combinations thereof. Other suitable diepoxides of cycloaliphatic esters of dicarboxylic acids are described, for example, in U.S. Pat. No. 2,750,395. Still other non-limiting examples of suitable cycloaliphatic epoxy resins may be 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexyl-methylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-m ethylcyclohexyl-methyl-3,4-epoxy-3-m ethylcyclohexane carboxylate; 3,4-epoxy-5-m ethylcyclohexyl-methyl-3,4-epoxy-5-methylcyclohexane carboxylate, di- or polyglycidyl ethers of cycloaliphatic polyols such as 2,2-bis(4-hydroxycyclohexyl)propane, and combinations thereof. Other suitable 3,4-epoxycyclohexylmethyl-3,4-epoxycyclohexane carboxylates may be described, for example, in U.S. Pat. No. 2,890,194. In various embodiments, the cycloaliphatic epoxy resins may be commercially available. Non-limiting examples of these commercially available cycloaliphatic epoxy resins may be vinylcyclohexene dioxide; 3,4-epoxycyclohexylmethyl-3,4-epoxycyclohexane carboxylate; 3,4-epoxy-6-methylcyclohexyl-methyl-3,4-epoxy-6-methylcyclohexane carboxylate; 3,4 epoxy cyclohexyl methyl 3,4 epoxy cyclohexyl carboxylate such as ERL-4221 (an epoxy resin mixture including 7-oxabicyclo[4.1.0]heptane-3-carboxylic acid and 7-oxabicyclo[4.1.0]hept-3-ylmethylester, formerly available from Union Carbide, bis(2,3-epoxycyclopentyl) ether; CELLOXIDE 2021, CELLOXIDE 2021P, CELLOXIDE 2021A, EPOLEAD GT301 and EPOLEAD GT401, alicyclic epoxides, diepoxides, and triepoxides available from Daicel Chemical Industries, Ltd., Japan.

Generally, the amount of the at least one cycloaliphatic epoxy resin used in the curable composition may range from 1 wt % to about 80 wt % of the total composition. In various embodiments, the amount of the at least one cycloaliphatic epoxy resin may range from 1 wt % to about 80 wt %, from 2 wt % to about 75 wt %, from 5 wt % to about 70 wt %, from 10 wt % to about 65 wt %, or from 20 wt % to about 60 wt % based on the total weight of the curable composition. When the amount of the at least one cycloaliphatic epoxy resin is below 1 wt %, the cost of the epoxy resin formulation would be expensive. When the amount of the cycloaliphatic epoxy resin is above the 80 wt %, the viscosity of the epoxy resin composition would be too high.

(c) Vinyl Ether Compound

In general, the at least one vinyl ether compound, component (c), comprises a di or tri-vinyl ether compound. Non-limiting examples of the at least one vinyl ether compound may be ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, trimethylol propane trivinyl ether, or mono-vinyl ether compounds, with or without hydroxyl functionality, such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol mono-vinyl ether, n-propylvinyl ether, isopropyl vinyl ether, 2-isopropenyl-4-methylene-1,3-dioxolane, dodecyl vinyl ether, diethylene glycol mono-vinyl ether, or combinations thereof.

The at least on vinyl ether compound useful in the present invention may be, for example, a vinyl ether represented by the following general Formula (I):

Formula (I)

where the vinyl ether group in the above Formula (I) is directly bonded to the terpenoid skeleton or aromatic skeleton.

In the above Formula (I), each $R_5$ group is selected from a vinyl ether group, a group having a vinyl ether skeleton and hydroxyl group, wherein at least one $R_5$ a has vinyl ether skeleton; $R_6$ is a (p+1)-valent group selected from alicyclic skeleton, cyclic ether compound and a skeleton having an aromatic ring; and p is a positive integer or zero. Useful vinyl ethers are described in U.S. Pat. No. 7,803,851 which is incorporated herein by reference. In a preferred embodiment, the vinyl ether may be triethylene glycol divinyl ether, diethyleneglycol divinyl ether, butanediol divinyl ether, and combinations thereof.

In various embodiments, the vinyl ether compounds mentioned above may have impurities of functional groups such as a hydroxyl group or a methylene group constituting the alicyclic skeleton is partially substituted by ketone group. These substituted compounds may be preferable in reducing the volatility of the vinyl ether compound.

Generally, the amount of the at least one vinyl ether compound used in the curable composition may range from 1 wt % to about 96 wt % of the total composition. In various embodiments, the amount of the at least one cycloaliphatic epoxy resin may range from 1 wt % to about 96 wt %, from 2 wt % to about 95 wt %, from 5 wt % to about 90 wt %, from 10 wt % to about 85 wt %, or from 20 wt % to about 80 wt % based on the total weight of the curable composition. When the amount of the at least vinyl ether compound is below 1 wt %, the cost of the formulation would be prohibitive. The use of amounts of the vinyl ether compound outside of the above ranges may increase the viscosity to such a high level that the composition would not be useful in the applications described herein.

(d) Cationic Photoinhibitor

The at least one cationic photoinhibitor, component (d), may be an onium salt. Non-limiting examples of cationic, onium salt photoinitiators are disclosed in Chapter 11 of the 2010 Handbook of Photochemistry and Photophysics of Polymeric Materials, Kahveci et al., incorporated herein by reference. For example, the onium salts that may be useful in the present include those compounds that contain chromophoric groups as the light sensitive body with heteroatoms as cationic centers in the compound's structure. Other cationic photoinitiators which may be used include nonionic photoinitiators such as fluorosulfonic esters of oximes.

Generally, the onium salts useful in the present invention may include aryldiazonium, diaryl iodonium, triarylsulfonium, tetraalkylphosphonium salts, and mixtures thereof with a nonnucleophilic counter ion. Chemical structures for these onium salts are shown in Formulas II-V.

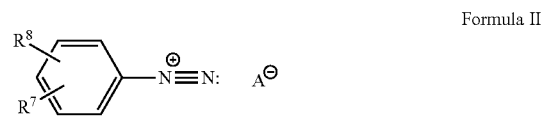

Formula II

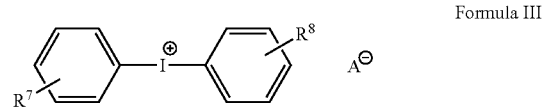

Formula III

In various embodiments, $R^7$ and $R^8$ may be independently an alkyl group, an aryl group, a heteroaryl group, a heteroalkyl group, an alkylaryl group, a halogen atom, a hydrogen atom, a nitro group, an alkoxy group, or an aryloxy group.

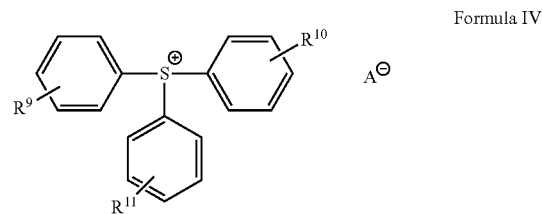

Formula IV

In other embodiments, $R^9$, $R^{10}$, and $R^{11}$ may be independently an alkyl group, an aryl group, a heteroaryl group, a heteroalkyl group, an alkylaryl group, a halogen atom, a hydrogen atom, an alkoxy group, a phenoxy group, a thiophenol group, a phenylsulfonyl-substituted aryl group or a phenylsulfenyl-substituted aryl group

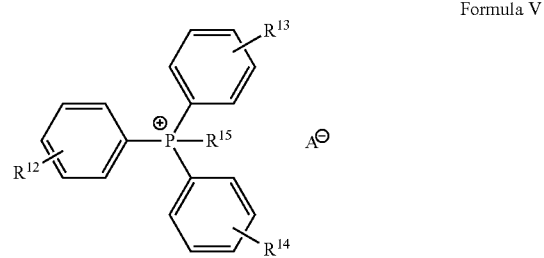

Formula V

In another embodiment, $R^{12}$, $R^{13}$, and $R^{14}$ and $R^{15}$ may be independently an alkyl group, an aryl group, a heteroaryl group, a heteroalkyl group, an alkylaryl group, a halogen atom, a hydrogen atom, a nitro group, an alkoxy group, an aryloxy group, and wherein $R^{15}$ may be allyl, benzyl, or xanthenyl.

Other non-limiting examples of onium salts may be N-alkoxy pyridinium, allylic onium, trialkyl phenacyl ammonium, dialkyl phenacyl sulfonium, or combinations thereof. These chemical structures are shown in Formulas VI-IX.

Formula VI

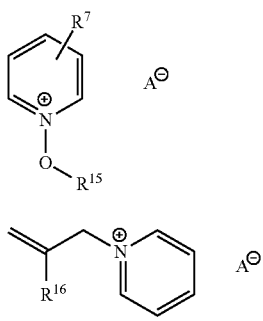

Formula VII

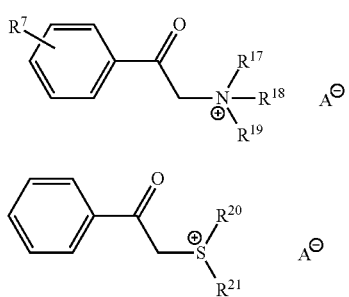

In various embodiments, $R^7$ and $R^{15}$ may be independently an alkyl group, an aryl group, a heteroaryl group, a heteroalkyl group, an alkylaryl group, a halogen atom, a hydrogen atom, a nitro group, an alkoxy group, or an aryloxy group and wherein $R^{16}$ is alkylcarboxy. In other embodiments, $R^{15}$ may be allyl, benzyl or xanthenyl.

Formula VIII

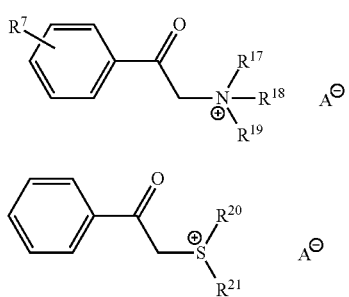

Formula IX

In other embodiments, $R^7$ may be independently an alkyl group, an aryl group, a heteroaryl group, a heteroalkyl group, an alkylaryl group, a halogen atom, a hydrogen atom, a nitro group, an alkoxy group, or an aryloxy group and wherein $R^{17}$, $R^{18}$, $R^{19}$, $R^{20}$, and $R^{21}$ may be independently an alkyl group, an aryl group, or a substituted aryl group, and mixtures thereof. These compounds may be used in the composition for producing the initiating species for cationic polymerization.

In other embodiments, other onium compounds that may be used in the present invention may include sulfonium compounds, iodonium compounds, and mixtures thereof as disclosed in EP1621594A1. For example, the sulfonium compounds may be represented by the following general Formulas (X) to (XIII):

Formula X

Formula XI

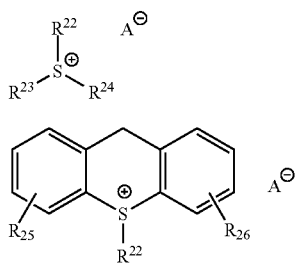

Formual XII

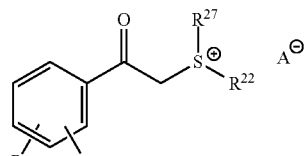

Formula XIII

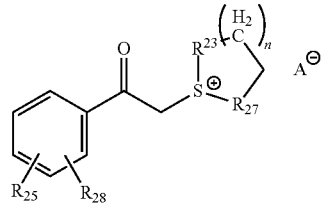

wherein $R^{22}$, $R^{23}$ and $R^{24}$ may be independently an alkyl group, an aryl group, a heteroaryl group, a heteroalkyl group, an alkylaryl group, a halogen atom, a hydrogen atom, an alkoxy group, a phenoxy group, a thiophenol group, a phenylsulfonyl-substituted aryl group or a phenylsulfenyl-substituted aryl group; Y may be $CH_2$, O or S; $R^{25}$, $R^{26}$, $R^{27}$ and $R^{28}$ may be independently an alkyl group, an alkoxy group, a hydrogen atom, or a halogen atom; and $A^-$ is as defined below.

In preferred embodiments, $R^{22}$, $R^{23}$ and $R^{24}$ are independently methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl, or phenylsulfonylphenyl; $R^{25}$, $R^{26}$, $R^{27}$ and $R^{28}$ are independently be an alkyl, methoxy, ethoxy, chlorine or bromine.

In other embodiments, the iodonium compounds may be represented by the following general Formulas (XIV) to (XVI):

Formula XIV

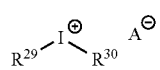

Formula XV

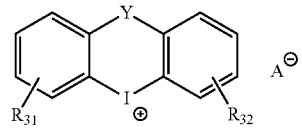

Formual XVI

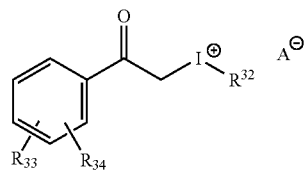

wherein $R^{29}$ and $R^{30}$ may be independently an alkyl group, an aryl group, a heteroaryl group, a heteroalkyl group, an alkylaryl group, a halogen atom, a hydrogen atom, an alkoxy group, a phenoxy group, a thiophenol group, a phenylsulfonyl-mono, a di or tri-substituted aryl group or a phenylsulfenyl-mono, di or tri-substituted aryl group; Y may be $CH_2$, O or S; $R^{31}$, $R^{32}$, $R^{33}$ and $R^{34}$ may be independently an alkyl group, an alkoxy group or a halogen atom; n may be 5 or 6; and $A^-$ is a non-nucleophilic anion.

In a preferred embodiment, $R^{29}$ and $R^{30}$ are independently methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl or phenylsulfonylphenyl; and $R^{31}$, $R^{32}$, $R^{33}$ and $R^{34}$ may be alkyl group, methoxy group, ethoxy group, chlorine atom bromine atom, or combinations thereof. Within the field of organic chemistry and particularly within the field of organic photoinitiators, it is widely understood that significant substitution of compounds may be tolerated or may be beneficial. In the present invention, for example, the term aryl group allows for substituents, which may be an alkyl, such as methyl, ethyl, propyl, hexyl, isooctyl, dodecyl, stearyl, etc.

The counter ion $A^-$, shown in Formulas (II) to (XVI), may represent a non-nucleophilic anion. Non-limiting examples of the counter ion $A^-$ may be fluorophosphate, fluoroantimonate, perfluoroalkylfluorophosphate, perfluoroalkylsulfonate, alkylsulfonate, fluoroborate, fluoroarylborate, perfluoroalkylarylborate, bis fluoroalkylsulfonyl methides, tris fluoroalkyl sulfonyl methides, bis fluoroalkylsulfonylimides; and any of the non-nucleophilic anions disclosed in U.S. Pat. No. 7,618,683B2, incorporated herein by reference.

The term "group" specifically envisions and allows for substitutions on alkyls which may be common in the art, such as hydroxy, halogen, nitro, cyano, alkoxy, carbonyl, keto, ester, carbamato, etc., as well as including an unsubstituted alkyl moiety. $A^-$ may include anions such as hexafluorophosphate, tris(perfluoroethyl)trifluorophosphate, hexafluoroantimonate, tetrafluoroborate, tetrakis(perfluorophenyl)borate, tetrakis((trifluoromethyl)phenyl)borate, tetrakis(3,5-di(trifluoromethyl)phenyl)borate, triflate, and perfluorobutanesulfonate. Examples of cationic initiators may also include, for example, triaryl sulfonium hexafluorophosphate, triaryl sulfonium tetrakis(perfluorophenyl)borate, and mixtures thereof. For example, a few specific embodiments of the photoinitiators optionally used in the ink formulation are shown in the following Table I:

TABLE I

Examples of Photoinitiators

| Compound | Features | Trade Name | Vendor |
|---|---|---|---|
| 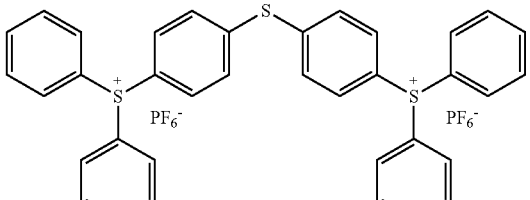<br>Triarylsulfonium hexafluorophosphate | 50% in PC<br>40% in PC<br><br>45% in PC<br><br>50% in PC<br>50% in PC | CPI 6992<br>DoubleCure 1190<br>Chivacure 1190<br>Esacure 19064<br>Garicure 6992 | Aceto Corporation<br>Double Bond Chemical Ind. Co., LTD<br>Chitec<br><br>Lamberti S.p.A.<br>Guarson Chemical Co., LTD |
| 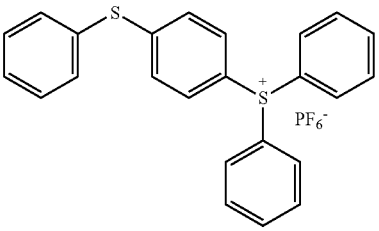<br>Triarylsulfonium hexafluorophosphate | 50% in PC | 100P | San Apro |
| 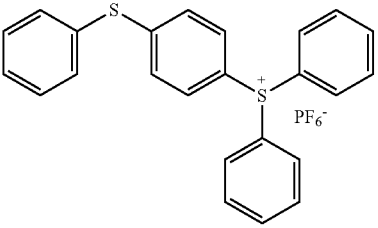<br>Triarylsulfonium tris(perfluoroethyl) | Salt | 210S | San Apro |

TABLE I-continued

Examples of Photoinitiators

| Compound | Features | Trade Name | Vendor |
|---|---|---|---|
| trifluorophosphate | | | |
| 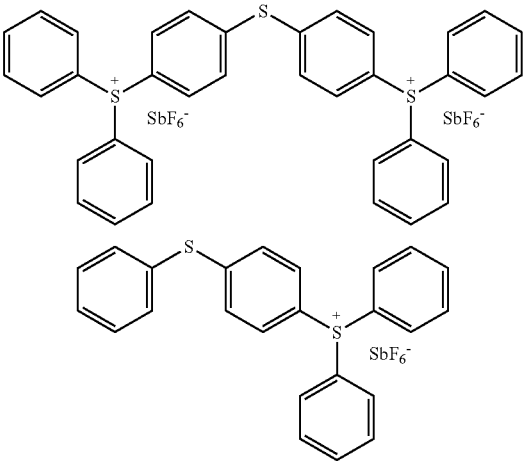<br>Triarylsulfonium hexafluoroantimonate | Salt<br><br>50% in PC[(1)]<br><br>50% in PC | Triarylsulfonium Hexafluoroantimonate<br><br>Doublecure 1176<br><br>Chivacure 1176 | Ningbo Fin-Chem., Co., LTD<br><br>Double Bond Chemical Ind. Co., LTD<br><br>Chitec |
| 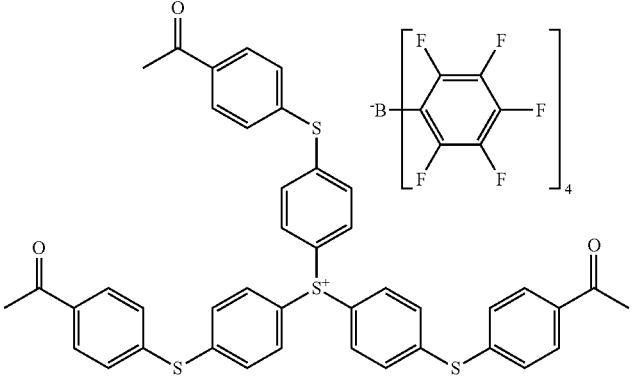<br>Triarylsulfonium tetrakis(perfluorophenyl)borate | Salt | Irgacure 290 | BASF |
| 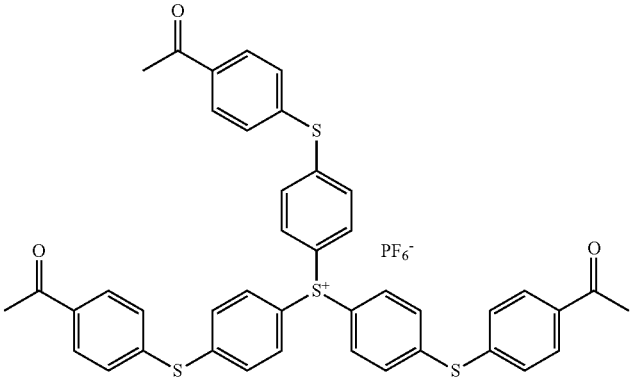<br>Triarylsulfonium hexafluorophosphate | Salt | Irgacure 270 | BASF |

TABLE I-continued

Examples of Photoinitiators

| Compound | Features | Trade Name | Vendor |
|---|---|---|---|
| Triarylsulfonium hexafluorophosphate | 75% in PC | Esacure 1187 | Lamberti S.p.A. |
| | 75% in Oxetane[2] | Esacure 1188[2] | |

Notes for Table I:
[1] "PC" indicates propylene carbonate.
[2] "Oxetane" is proprietary oxetane used by the indicated vendor.

In preferred embodiments, the cationic photoinitiator useful in the present invention may be triarylsulfonium hexafluoroantimonate, Ingracure 290, and San Apro 100P.

Generally, the amount of the at least one cationic initiator compound used in the epoxy resin composition may be from 0.2 wt % to about 20 wt %. In various embodiments, the amount of the at least one cationic inhibitor may be from 0.2 wt % to about 20 wt %, from 1 wt % to about 15 wt %, from 2 wt % to about 12 wt %, or from 2 wt % to about 10 wt % based on the total weight of the curable composition. When the amount of the cationic photoinhibitor is in excess of the above ranges, corrosion of the ink jet printer head may occur. When the amount of the photoinhibitor is below the amount of the above ranges, curing of the composition is significant decrease under UV radiation. For example, if the mixing ratio of the cationic initiator compound is less than 2 parts by weight per 100 parts by weight of the mixture, the sensitivity of the inkjet ink may degrade. If the mixing ratio of the cationic initiator compound exceeds 20 parts by weight per 100 parts by weight of the mixture, the viscosity of the mixture may increase with time and thereby 1) degrade the coating properties of the ink and 2) lower the hardness of the resultant photo-cured ink film. In addition, the piping or the print-head of the apparatus using the inkjet ink may corrode.

(e) Colorant

The colorant compound useful in the present invention may include one or more pigments, dyes, coloring agents, and combinations thereof. In preferred embodiment, the colorant is a pigment.

Examples of pigments useful in the compositions include, for example, one or more of the pigments described in the Color Index (C.I.) and shown in the tables below. Any of the pigments known in the art as a coloring material and fundamentally capable of diffusing into a solvent may be used in the present invention. Since an acid is typically employed in the curing mechanism of cationic curing type materials, it may be preferable to employ pigments that do not tend to discolor in the presence of the acid.

In various embodiments, photoabsorptive pigments may be used in the present invention. Non-limiting examples of such photoabsorptive pigments may include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; pigments formed of metal powder such as aluminum powder, bronze powder, and zinc powder; and mixtures thereof.

In other embodiments, the pigment may be a black pigment. Non-limiting examples of pigments that may be employed in the manufacture of a black ink include carbon black such as Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all available from Dexa Co., Ltd.); and mixtures thereof.

In other embodiments, the pigment may be a yellow pigment. Non-limiting examples of yellow pigments may be C.I. Pigment Yellow 128, C.I. Pigment Yellow 129, C.I. Pigment Yellow 150, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 139, Pigment Yellow 180, and mixtures thereof. In a preferred embodiment, the yellow pigment useful in the present invention may include an imidazolone pigment that does not tend to discolor by the effect of an acid, including for example Pigment Yellow 139, Pigment Yellow 180, and mixtures thereof. Table II shows some representative examples of yellow pigments.

TABLE II
Examples of Yellow Pigments
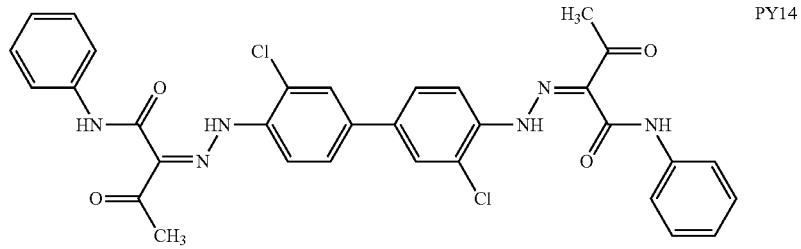
PY14
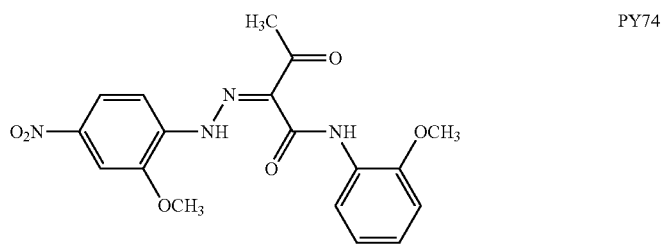
PY74
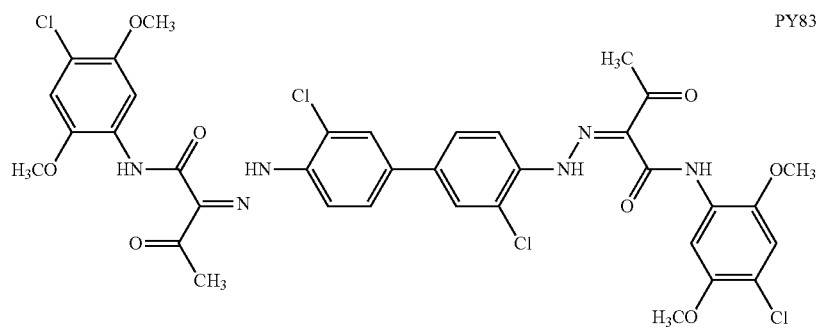
PY83
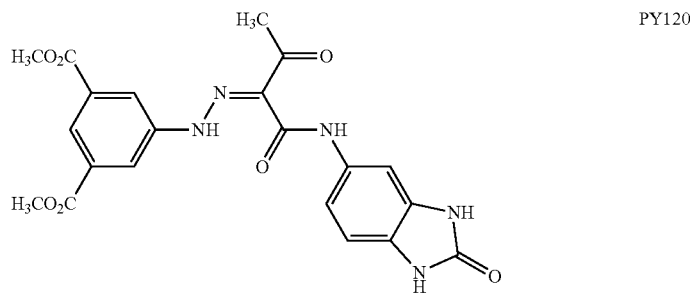
PY120
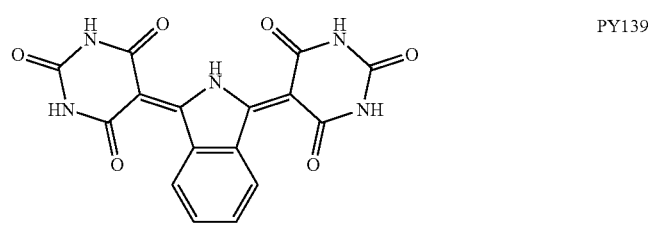
PY139

TABLE II-continued

Examples of Yellow Pigments

PY150

PY151

PY155

In another embodiment, the pigment may be a magenta pigment. Non-limiting examples may be C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 177, C.I. Pigment Red 170, C.I. Pigment Red 176, C.I. Pigment Red 122, C.I. Pigment Violet 19, and mixtures thereof. In a preferred embodiment, the magenta pigment useful in the present invention may include a quinacridone pigment that does not tend to discolor by the effect of an acid and which are all excellent in dispersibility, including for example Pigment Red 122, Pigment Violet 19, Pigment Red 57:1, and mixtures thereof. Table III shows some representative magenta pigments.

TABLE III
Examples of Magenta Pigments
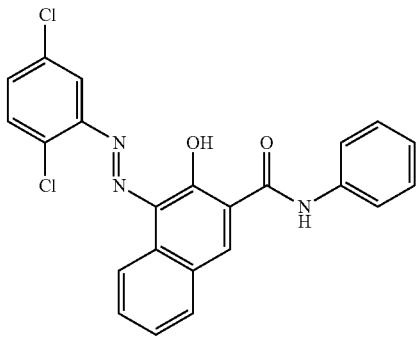 [SMILES: O=C(Nc1ccccc1)c1cc2ccccc2c(/N=N/c2cc(Cl)ccc2Cl)c1O]
PR2
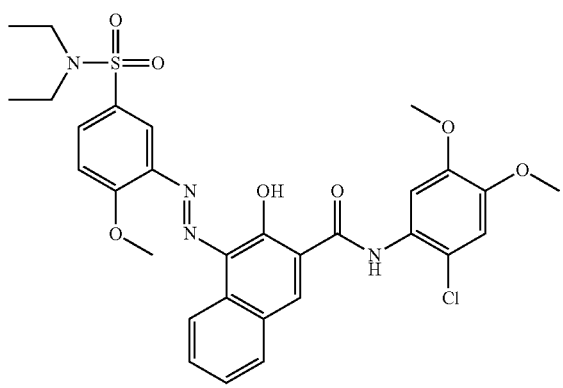 [SMILES: CCN(CC)S(=O)(=O)c1ccc(OC)c(/N=N/c2c(O)c(C(=O)Nc3cc(OC)c(OC)cc3Cl)cc3ccccc23)c1]
PR5
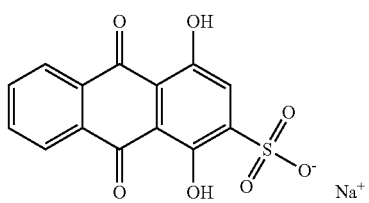 [SMILES: O=C1c2ccccc2C(=O)c2c(O)c(S(=O)(=O)[O-])cc(O)c21 ; [Na+]]
PV5
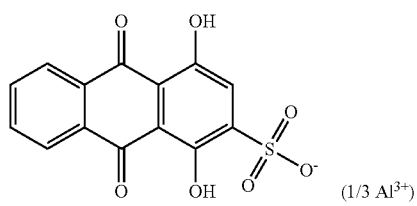
PV5
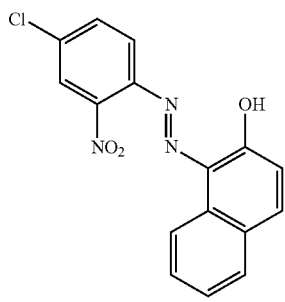 [SMILES: O=[N+]([O-])c1cc(Cl)ccc1/N=N/c1c(O)ccc2ccccc12]
PR6

TABLE III-continued
Examples of Magenta Pigments
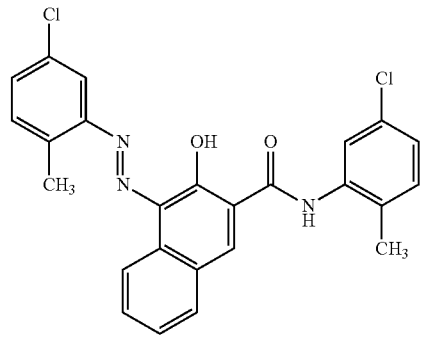 [SMILES: Cc1ccc(Cl)cc1/N=N/c1c(O)c(C(=O)Nc2cc(Cl)ccc2C)cc2ccccc12]  PR11
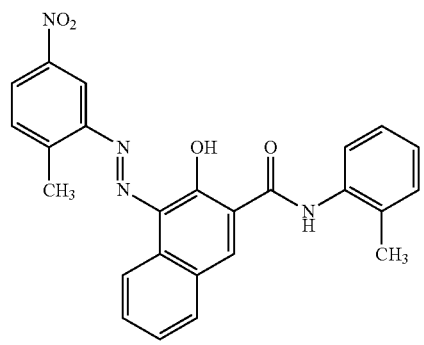 [SMILES: Cc1ccc([N+](=O)[O-])cc1/N=N/c1c(O)c(C(=O)Nc2ccccc2C)cc2ccccc12]  PR12
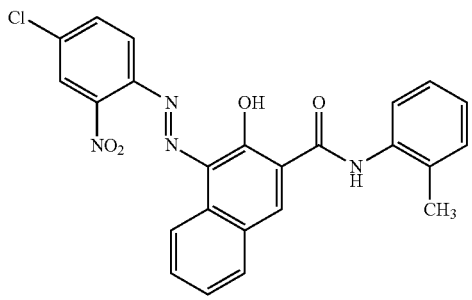 [SMILES: Cc1ccccc1NC(=O)c1cc2ccccc2c(/N=N/c2ccc(Cl)cc2[N+](=O)[O-])c1O]  PR14
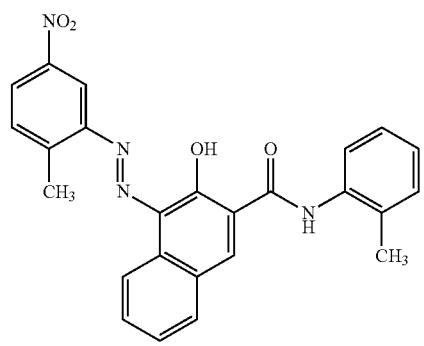 [SMILES: Cc1ccc([N+](=O)[O-])cc1/N=N/c1c(O)c(C(=O)Nc2ccccc2C)cc2ccccc12]  PR17
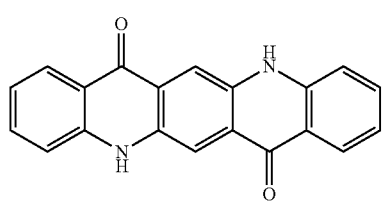 [SMILES: O=c1c2ccccc2[nH]c2cc3c(=O)c4ccccc4[nH]c3cc12]  PV19

TABLE III-continued
Examples of Magenta Pigments
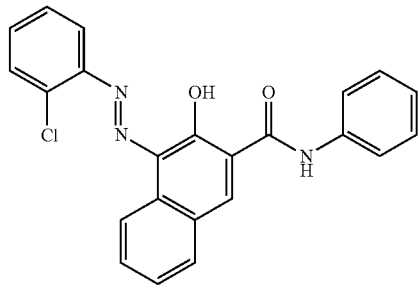 [SMILES: O=C(Nc1ccccc1)c1cc2ccccc2c(/N=N/c2ccccc2Cl)c1O]
PR21
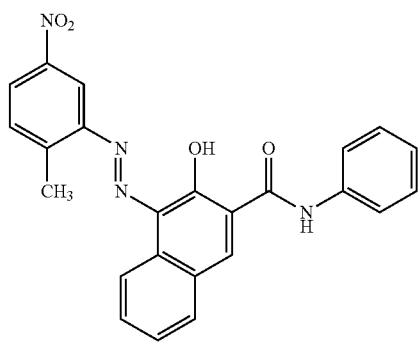 [SMILES: Cc1ccc([N+](=O)[O-])cc1/N=N/c1c(O)c(C(=O)Nc2ccccc2)cc2ccccc12]
PR22
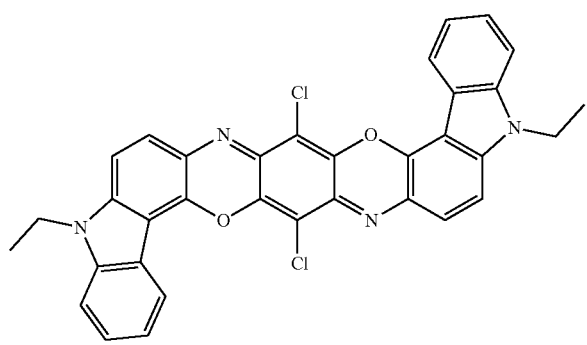 [SMILES: CCn1c2ccccc2c2c3c(ccc21)N=c1c(Cl)c2c(c(Cl)c1O3)=Nc1ccc3c(c1O2)c1ccccc1n3CC]
PV23
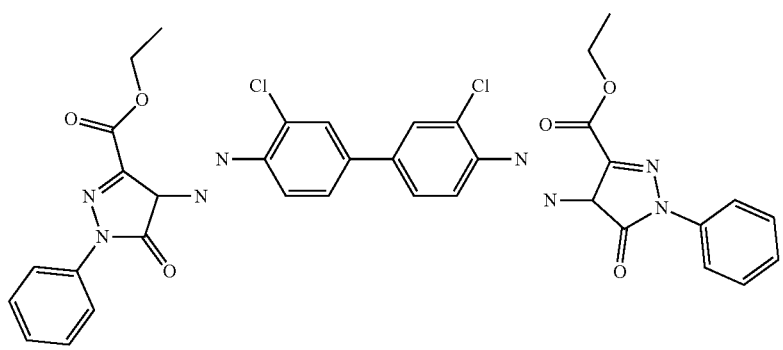
PR38

TABLE III-continued
Examples of Magenta Pigments
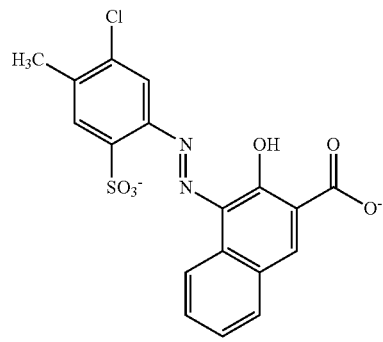
PR48:2
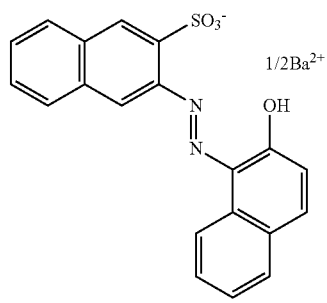
PR49:1
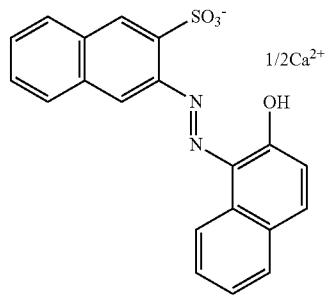
PR49:2
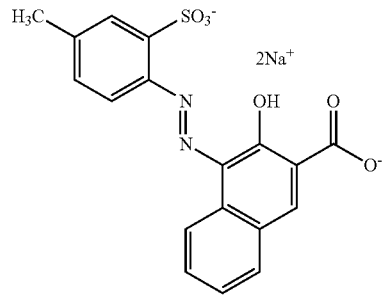
PR57
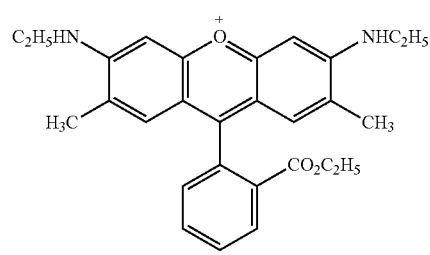
PR81

TABLE III-continued
Examples of Magenta Pigments
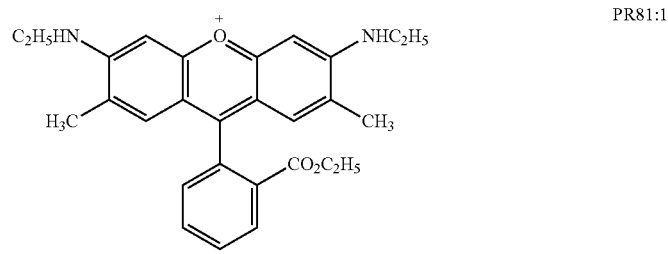
PR81:1
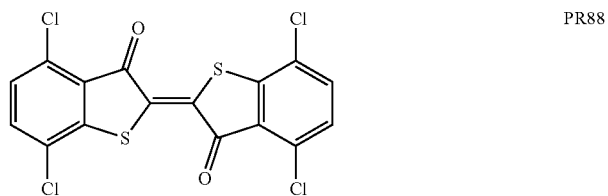
PR88
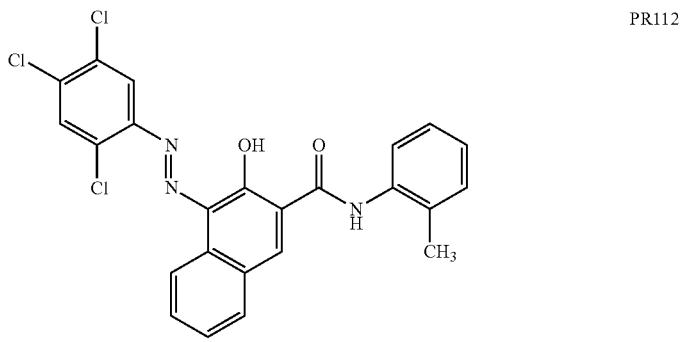
PR112
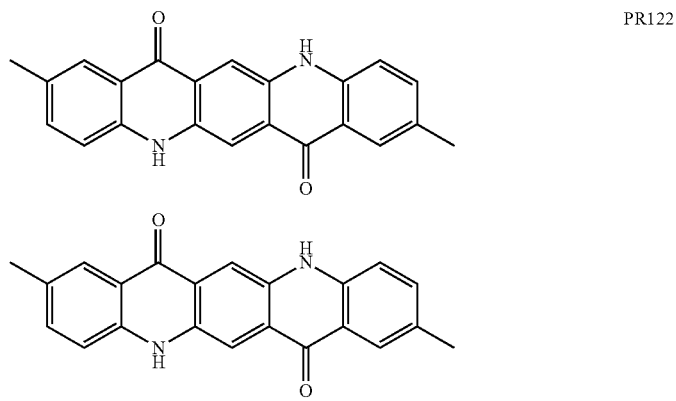
PR122
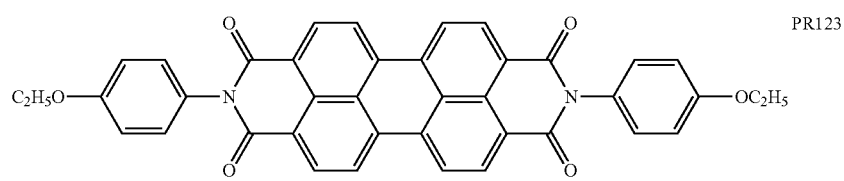
PR123

TABLE III-continued
Examples of Magenta Pigments
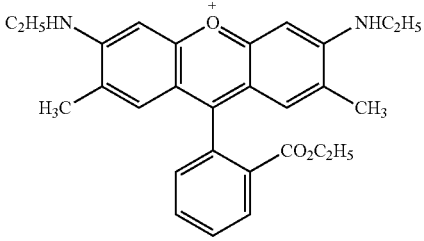
PR169
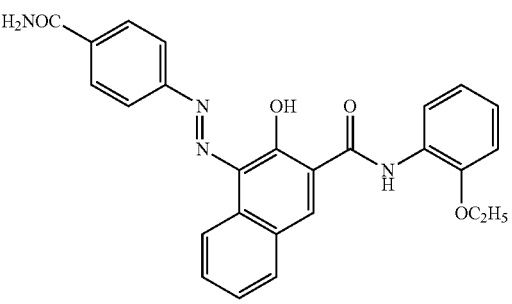 [SMILES: CCOc1ccccc1NC(=O)c1cc2ccccc2c(/N=N/c2ccc(C(N)=O)cc2)c1O]
PR170
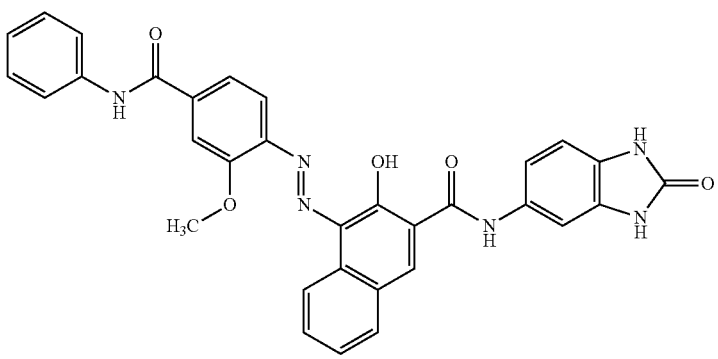 [SMILES: COc1cc(C(=O)Nc2ccccc2)ccc1/N=N/c1c(O)c(C(=O)Nc2ccc3[nH]c(=O)[nH]c3c2)cc2ccccc12]
PR176
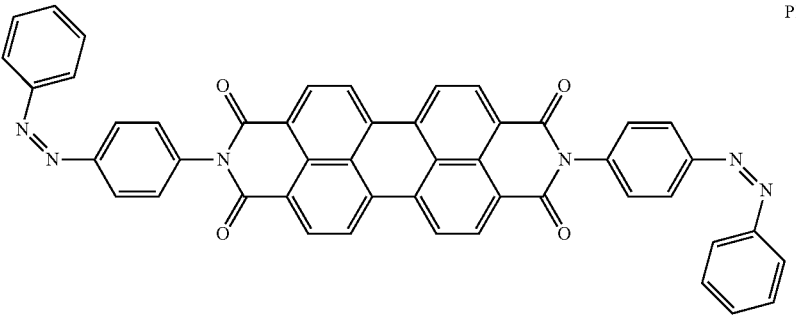
PR178
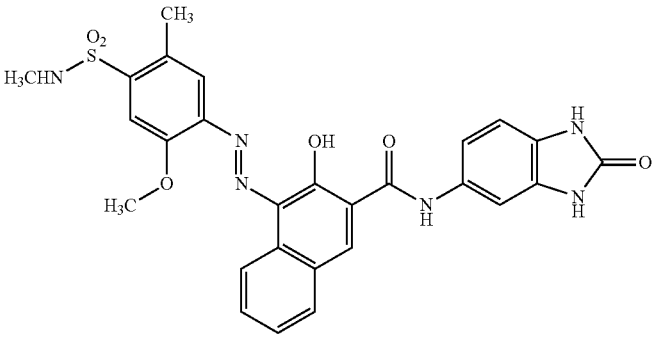
PR185

TABLE III-continued

Examples of Magenta Pigments

PR224

PR254

PR257

In other embodiments, the pigment may be a cyan pigment. Non-limiting examples of cyan pigments may be C.I. Pigment Blue 15:3, C.I. Pigment Blue 15:4, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60. In a preferred embodiment, the cyan pigment useful in the present invention may include a phthalocyanine pigment that does not tend to discolor by the effect of an acid, including for example Pigment Blue 15:3. Table IV shows some representative cyan pigments.

TABLE IV

Examples of Cyan Pigments.

PB15

TABLE IV-continued

Examples of Cyan Pigments.

PB60

PB22

In still other embodiments, the pigment may be a white pigment. Non-limiting examples of white pigments may be natural clay, white lead, zinc white, metal carbonates such as magnesium carbonate, metal oxides such as barium and titanium, and mixtures thereof can be used. An inkjet ink containing a white pigment may be used for example in white printing applications and for amending previously printed items or underlying images through overwriting.

In yet another embodiment, the pigment may be an organic pigment. Non-limiting examples of organic pigments may be nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; isoindolinone pigment; and mixtures thereof.

In still another embodiment, the pigment may be a fluorescent pigment. Fluorescent pigments may be an inorganic fluorescence materials, organic fluorescence materials, and mixtures thereof. Non-limiting examples of inorganic fluorescence materials may include $MgWO_4$, $CaWO_4$, $(Ca,Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, inorganic acid salts such as tungstenate and sulfate; and mixtures thereof. Non-limiting examples of organic fluorescence materials may be acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ε-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine 0, fluorescamine, fluorescein isocyanate, 7-chloronitrobenzo-2-oxa-1,3-diazole, dansylaziridine, 5-(iodoacetamide ethyl) am inonaphthalene-1-sulfonic acid, 5-iodoacetamide fluorescein, N-(1-anilinonaphthyl 4) maleimide, N-(7-dimethyl-4-methylcumanyl) maleimide, N-(3-pyrene) maleimide, eosin-5-iodoacetamide, fluorescein mercury acetate, 2-[4'-(2''-iodoacetamide)]aminonaphthalene-6-sulfonic acid, eosin, Rhodamine derivatives, organic electroluminescent (EL) dye, organic EL polymer, organic EL crystal, dendrimer, and mixtures thereof.

The above pigments useful as a color may include any pigment capable of exhibiting optical coloring and tinting functions. The pigments employed in the inkjet ink composition of the present invention, in addition to exhibiting coloring and tinting properties, may also exhibit other beneficial properties such as magnetism, fluorescence, conductivity, dielectric property, and the like. A pigment used in the present invention composition that exhibits various properties, may beneficially provide a printed image having various functions.

In yet another embodiment of the present invention, an inkjet ink may additionally include a powder material capable of enhancing thermal and mechanical properties of the resultant ink formulation and/or cured ink film. For example, properties such as increased heat resistance and/or increased physical strength of the ink can be obtained by using the ink composition of the present invention The pigment may also comprise a conductive material, a magnetic material, or a material which would exhibit a high dielectric property. This conductive material may provide the pigment with electrical conductivity. Non-limiting examples of conductive materials may be a conductive carbon pigment; carbon fiber; powder of copper, silver, antimony and other noble metals, or mixtures thereof. Non-limiting examples of magnetic materials may be iron oxide powder, a ferromagnetic powder, and mixtures thereof. Non limiting examples of materials which would exhibit a high dielectric property may be a metal oxide powder such as tantalum oxide, titanium oxide, or combinations thereof.

Generally, the amount of the at least one colorant compound used in the curable composition may range from 0.1 wt % to about 50 wt % based on the total weight of the composition. In various embodiments, the amount of the at least one colorant compound used in the curable composition may range from 0.1 wt % to about 50 wt %, from 1 wt % to about 40 wt %, from 1.5 wt % to about 35 wt %, or from 2 wt % to about 30 wt %. The use of an amount of colorant lower than 0.1 wt % turns the ink into a pale color shade ink.

The composition of the present invention may also include dyes as an auxiliary component of the colorant or pigment. In one embodiment, the colorant may be a dye which are low in acidity and basicity; and are excellent in solubility to a solvent Non-limiting examples of such dyes include azoic dye, sulfur (building materials) dye, disperse dye, fluorescent brightening agent, oil soluble dye, and mixtures thereof. In a preferred embodiment, an oil soluble dye such as azo dye, triaryl methane dye, anthraquinone dye, azine dye, and mixtures thereof may be utilized. Other non-limiting examples of such oil soluble dye may be C.I. Solvent Yellow-2, 6, 14, 15, 16, 19, 21, 33, 56, 61 and 80; Diaresin Yellow-A, F, GRN and GG; C.I. Solvent Violet-8, 13, 14, 21 and 27; C.I. Disperse Violet-1; Sumiplast Violet RR; C.I. Solvent Blue-2, 11, 12, 25 and 35; Diaresin Blue-J, A, K and N; Orient Oil Blue-IIN, #603; Sumiplast Blue BG; and mixtures thereof.

In still another embodiment, a colorant may include a pigment and an oil-soluble dye that have excellent weather resistance and rich color reproduction. Such colorants may be selected from any known colorant such as a soluble dye. In one preferred embodiment, the colorant, suitably used in the ink composition or the inkjet recording ink composition of the present invention does not function as a polymerization inhibitor in a polymerization reaction (i.e., the curing reaction of the present invention). In the above preferred embodiment, the degradation of the sensitivity of the curing reaction by actinic radiation should be avoided.

The oil-soluble dye may be used a dye that is substantially insoluble in water. For example, the solubility of the oil-soluble dye in water at 25° C. (i.e., the mass of dye that can be dissolved in 100 g of water) generally may be no greater than 1 g. In various embodiments, the solubility of the oil soluble dye in water at 25° C. may be no greater than 0.75 g, no greater than 0.5 g, no greater than 0.25 g, and no greater than 0.1 g. In a preferred embodiment, the so-called water-insoluble pigment or oil-soluble dye may be the oil-soluble dye.

In the present invention, the oil-soluble dye may be used singly or as a combination of two or more oil-soluble dyes. In other embodiments, the composition may include an additional colorant such as a water-soluble dye, a disperse dye, or a pigment in a concentration range that does not interfere with or is not deleterious to the beneficial effects of the present invention.

In various embodiments, the oil-soluble dye may be any yellow dye. Non-limiting examples of the yellow dye may be an aryl or heteryl azo dyes having a coupling component such as a phenol, a naphthol, an aniline, a pyrazolone, a pyridone, or an open-chain active methylene compound; an azomethine dyes having a coupling component such as an open-chain active methylene compound; a methine dye such as benzylidene dye and monomethineoxonol dye; quinone dye such as naphthoquinone dye and anthraquinone dye; and other dye species such as quinophthalone dye, nitro/nitroso dye, acridine dye, and acridinone dye; and mixtures thereof.

In other embodiments, the oil-soluble dye may be any magenta dye. Non-limiting examples of the magenta dye may include an aryl or heteryl azo dye having a coupling component such as a phenol, a naphthol, or an aniline; an azomethine dye having a coupling component such as a pyrazolone or a pyrazolotriazole; a methine dye such as arylidene dye, styryl dye, merocyanine dye, and oxonol dye; a carbonium dye such as diphenylmethane dye, triphenylmethane dye, and xanthene dye; quinone dye such as naphthoquinone, anthraquinone, or anthrapyridone; a condensed polycyclic dye such as dioxazine dye; and mixtures thereof.

In another embodiment, the oil soluble dye may be a cyan dye. Non-limiting examples of the cyan dye may be an indoaniline dye, an indophenol dye, and a azomethine dye having a coupling component such as a pyrrolotriazole; a polymethine dye such as cyanine dye, oxonol dye, and merocyanine dye; a carbonium dye such as diphenylmethane dye, triphenylmethane dye, and a xanthene dye; a phthalocyanine dye; an anthraquinone dye; an aryl or heteryl azo dye having a coupling component such as a phenol, a naphthol, or an aniline; an indigo/thioindigo dye; and mixtures thereof.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure. Non-limiting examples of these dyes may be CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2. Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, Neopen Cyan FF4238 (manufactured by BASF); and mixtures thereof.

In general, the disperse dye may be used in a range that enables it to be dissolved in a water-immiscible organic solvent. Non-limiting examples of these disperse dyes may be CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; CI Disperse Green 6:1 and 9; and mixtures thereof. The above described pigments and dyes may be employed singly or in a combination of two or more pigments and/or dyes for the purpose of enhancing the photoabsorbance, chroma and color vision.

A common problem known in the art with inks that comprise pigments is the aggregation of the pigment particles due to the inherent instability of such dispersion systems. In another embodiment, the composition for inkjet ink (e.g., for graphic applications) may contain, as an optional component, a pigment dispersant (also referred to as a pigment stabilizer) sufficient to disperse the pigments and provide stabilization to the dispersion.

One stabilization mechanism for hydrophobic pigments, such as carbon black, useful in the present invention may be an electrostatic stabilization mechanism described in Shlomo Magdassi, in Chapter 2 of Chemistry of Inkjet Inks (2010), incorporated herein by reference. Hydrophobic pigments tend to form large aggregates in water; and to prevent this aggregation, a mechanism to overcome the attraction of the pigment particles due to van der Waals forces is needed. One such mechanism to minimize the aggregation is electrical repulsion, which may be obtained when the surface of pigment particles bear electrical charges. An electrical charge may be imparted to pigment particles with the use of an anionic surfactant, such as SDS (sodium dodecylsulfate). It is theorized that the surfactant may be adsorbed on the surface of hydrophobic pigments, and imparts negative charges to the pigment surface. Thus, as particles approach each other and the distance between the particles decreases, electrical repulsion takes place resulting in dispersion of the particles. As described by the Derjaguin and Landau, Verwey and Overbeek (DLVO) theory, if the repulsion overcomes the attraction, an energy barrier may exist and prevent aggregation of the particles. The above-described electrostatic stabilization mechanism may be effective in systems having a high dielectric constant, such as water-based inks.

In another embodiment, additional stabilization may be achieved by a steric mechanism. This mechanism involves a polymer dispersant wherein the polymer is adsorbed onto the surface of a pigment (through groups in the polymer which have affinity to the pigment surface), and wherein the polymer provides steric repulsion. For example, carbon black pigment may be stabilized using a polymer which has hydrophobic groups which can bind to the surface of the pigment, and also has sufficiently long hydrophilic segments that are soluble in water. This stabilization mechanism may be very effective for both aqueous and non-aqueous ink systems. Non-limiting commercially available polymeric dispersants useful in the present invention may include for example, Efka, Tego Dispers, Solsperse, Disperbyk, and Sokalan.

In other embodiments, other pigment stabilizers may be a polyester, a polyurethane of polyacrylate type, especially in the form of high molecular weight block copolymer, and would typically be incorporated at 2.5% to 100% by weight of the pigment. Non-limiting examples may be DISPERBYK (ex BYK Chemie), SOLSPERSE (example Zeneca) dispersants, non-polymeric and polymeric dispersants for example, as disclosed in McCutcheon's Functional Materials, North American Edition, Manufacturing Confectioner Publishing Co., Glen Rock, N.J., pp. 110-129 (1990), incorporated herein by reference. Other non-limiting examples of pigment stabilizers may be the pigment stabilizers disclosed in US 20050277708 A1, DE 19636382, U.S. Pat. Nos. 5,720,802, 5,713,993, PCT/GB95/02501, U.S. Pat. No. 5,085,689; and GB 2303376. In a preferred embodiment, but not limited thereto, the type of pigment dispersant used herein to keep pigments from aggregating may be a polymeric dispersant such as for example the Solsperse series manufactured by Avecia as disclosed in US20070160815, incorporated herein by reference. Furthermore, the composition may include a dispersion adjuvant, as a synergist, for the pigment. For example, the above pigments may be dispersed in a predetermined dispersing medium to prepare pigment dispersion as described in EP1621594A1, incorporated herein by reference.

Generally, the pigment dispersant and dispersion adjuvant may be added to the composition at a concentration of from 1% to about 50% by weight relative to the weight of the pigment. In various embodiments, the content of the pigment component in the pigment dispersion may be generally in the range of from 3% to about 41% by weight, and from 4% to about 27% by weight based on the pigment dispersion. If the content of the pigment component is less than 3% by weight, it may be difficult to secure a sufficient color density when the pigment dispersion is employed as coloring material in a subsequent working process. If the content of the pigment component is increased over 41% by weight, the stability of the pigment dispersion may be degraded.

A polymeric dispersing agent having a basic terminal end may be employed as a suitable dispersing for the pigment. The polymeric dispersing agent may be capable of entering into the interface between pigment particles, thereby preventing the aggregation of the pigment particles. The dispersing agent may also be capable of enhancing the affinity of the pigment particles to the dispersing medium, thereby preventing the pigment particles from settling. Generally, any type of resin component which exhibits an affinity to a dispersing medium and is capable of exhibiting a steric separability for preventing the aggregation of the pigment particles may be employed as the aforementioned polymeric dispersing agent. Non-limiting examples of the polymeric dispersing agent may be selected from the group consisting of vinyl polymer or copolymer, acrylic polymer or copolymer, polyester, polyamide, polyimide, polyurethane, amino-based polymer, silicon-containing polymer, sulfur-containing polymer, fluorine-containing polymer, epoxy resin, and mixtures thereof.

In one embodiment, the polymeric dispersing agent may be constructed such that the terminal moiety of the polymer is provided with high bonding property or affinity to the pigment and the main chain of the polymer is provided with affinity to the dispersing medium as well as with physical repulsive force or electrostatic repulsive force for preventing the re-aggregation thereof with pigment particles. For example, polymers having a solubility parameter which is substantially equivalent to that of the dispersion medium, a molecular weight ranging from several hundreds to tens of thousands, a polymerization degree ranging from about 10 to about 200, and a glass transition temperature (Tg) value ranging from about 10° C. to about 200° C.

In other embodiments, polymers or resins comprising terminal moieties exhibiting a relatively strong chemical bonding property (such as covalent bond, electrostatic force) may be utilized to provide an affinity to the pigment. In order to achieve the aforementioned composite functions, the resin may be formulated as a copolymer comprising two or more monomers. The terminal moiety of the polymer which may be constructed as previously described but may be introduced into any distal end of the polymer or into a tandem end of tandem polymer that has been graft-copolymerized. These polymers may not be only strong in bonding property but also may be liable to form steric hindrance which may be effective in suppressing the re-aggregation among pigment particles. Non-limiting examples of monomers for synthesizing the above polymers, may be styrene, substituted styrene, (metha)acrylic ester, (metha)acrylic acid, (metha)acrylic amide, maleic acid, maleic anhydride, maleic ester, itaconic acid, itaconic ester, hydroxystyrene, hydrogen atom-substituted derivatives of hydroxystyrene, and mixtures thereof. Non-limiting examples of polymers having an ester side chain provided with long chain alkyl, polyether, polycarbonate or polyester may advantageous in creating the aforementioned tandem polymer.

In various embodiments, a polymer compound may be a polymer component in the composition. Non-limiting examples of the polymers useful may include: (i) polyester compounds which may be obtained through dehydrocondensation between a dihydroxy compound and dicarboxylic acid such as poly(oxyphthaloyloxymethylene-1,4-phenylenemethylene) and poly(1,4-cyclohexylenedimethylene succinate); (ii) polyamides which may be obtained through condensation between diamine and dicarboxylic acid, e.g., between adipic acid and hexamethylene diamine, or through ring-opening of cyclic lactone such as ε-caprolactam; (iii) certain polyamides which may be relatively low in Tg among the polyamides that can be obtained through condensation between tetra-carboxylic acid such as pyromellitic acid and aliphatic diamine; (iv) polyurethane resin which may be obtained through a reaction between isophorone dicyanate or aliphatic diisocyanate and dihydroxy compound; (v) polyvinyl pyridine compounds; (vi) polydimethyl siloxane and ladder polymers thereof; (vii) polyvinyl alcohols; (viii) polyvinyl ethers; (ix) polyether-based polymer which can be obtained through polymerization of an oxirane compound having a relatively rigid skeleton; and mixtures thereof. The terminal ends of above polymers may be capped with a compound having a functional group such as amino group, phosphoric group, and the like, each capable of exhibiting affinity to pigments or pigment synergists.

In addition to the above compounds, a pigment synergist compound may be used for the purpose of enhancing the bonding properties of the pigment to a dispersing agent (discussed hereinafter). Generally, the pigment synergist may be modified with a suitable functional group such as carboxylic group for the purpose of enhancing the dispersibility of pigment; as described in EP1621594A1, incorporated herein by reference. Non-limiting examples of suitable functional groups which may be contained or on the surface on the pigment may be a carboxylic group, a sulfonic group, a phosphoric group, or other group exhibiting strong bonding properties to amino groups since an amino group may be a typical terminal group of dispersing agents. This type of pigment may be created by various treatments such as the oxidation of the surface of pigment crystal with an oxidizing agent, the modification of the surface of pigment with a sulfonating agent, and the adsorption of a compound (synergist) which may be capable of exhibiting not only a strong physical adsorption to the pigment but also affinity to the resinous dispersing agent on the surface of pigment. In one embodiment, the modified pigment with a sulfonating agent, for example, may provide an excellent bonding strength between the pigment and a dispersing agent and in density of bonding points, thereby making the pigment excellent in stability and suitable for use.

In one preferred embodiment, the terminal moieties of the aforementioned dispersing agent may be made basic, provided with a plurality of basic groups, or provided with a strong basic group, and such compound can increase the electrostatic adsorbability of pigment surface or synergist to an acidic group. More specifically, a polymeric dispersing agent having a terminal substituent group (such as monovalent amino compound) whose pKb value is 4 or less may be used in the present invention. In this case basicity of the substituent group is impossible to measure; and therefore, the basicity of the substituent group can be determined by referring to the pKb value of a methane compound having the same substituent group. Non limiting examples of such a substituent group may include a group having a dialkyl amino terminal group having one to two carbon atoms; an alkyl amino group having a hydrogen atom; a group having a piperidine or a pyrrolydine skeleton; a group having a structure exhibiting a relatively strong basicity such as Hunig's base, diazabicycloundecene (DBU) or proton sponge; a compound having guanidine skeleton; and the like.

In general, the ratio of these resinous components that have been adsorbed onto the pigment may be generally in the range of from about 1% to about 50% by weight based on the weight of pigment. If the ratio of the resinous components falls outside this range, the dispersion stability of the pigment may be degraded or the resultant dispersion may become very viscous. For instance, when such a dispersion is employed for inkjet printing, the discharge stability of ink may be deleteriously affected. As long as the mixing ratio is confined within the range which does not deleteriously affect the photosensitivity and hardness cured of ink, part of the resinous component may be left remained undissolved in the solvent without being adsorbed onto the pigment. A more preferable content of the resinous components relative to the pigment may differ to a certain extent depending on the kinds of pigment.

(f) Optional Additives

In various embodiments, the curable epoxy resin composition may further comprise at least one additive chosen from an oxetane, another epoxy compound other than the divinylarene dioxide, a filler, a reactive diluent, a flexibilizing agent, a processing agent, and a toughening agent.

In some embodiments, the curable epoxy resin composition may comprise an oxetane which are four-membered cyclic ether. A non-limiting example of oxetanes may be 3-ethyl-3-hydroxy(methyl)oxetane also known as trimethylolpropane oxetane and available as OXT-101 from Toagosei and available as TMPTO from Perstorp. Other non-limiting examples of oxetanes may include 1,4-bis[(3-ethyl-oxetanylmethoxy)methyl]benzene also known as OXT-121; 3-ethyl-3-phenoxymethyloxetane also known as OXT-211; bis{[1-ethyl(3-oxetanyl)]methyl}ether also known as OXT-221; and 3-ethyl-3-(2 ethylhexyloxy)methyl)oxetane also known as OXT-212; and OXT-610 silyloxetane all available from Toagosei.

In general, the optional oxetane may be present in the curable epoxy resin composition at a concentration of generally from 0 to about 15 wt %. In various embodiments, the optional oxetane may be present from 0 wt % to about 15 wt %, from 0.01 wt % to about 12 wt %, or from 0.05 wt % to about 10 wt %, In a preferred embodiment, the optional oxetane may be present in the epoxy resin composition from about 0.1 wt % to about 5 wt % of the total composition.

The curable composition of the present invention may optionally include at least one other epoxy compound other than the divinylarene dioxide to form the epoxy matrix in a final curable formulation. For example, the epoxy compound useful in the present invention may include any conventional epoxy compound. One embodiment of the epoxy compound used in the curable composition of the present invention, may be for example a single epoxy compound used alone; or a combination of two or more epoxy compounds known in the art such as any of the epoxy compounds described in Lee, H. and Neville, K., Handbook of Epoxy Resins, McGraw-Hill Book Company, New York, 1967, Chapter 2, pages 2-1 to 2-27, incorporated herein by reference. In a preferred embodiment, the epoxy compound may include for example epoxy resins based on oxidation products of vinyl compounds. A few non-limiting examples may be Synasia 28, ELO (epoxidized linseed oil), limonene dioxide, cyclohexene oxide, and mixtures thereof.

Generally, the amount of the optional second epoxy compound, when used in the curable composition of the present invention, may be from 0 wt % to about 50 wt % based on the total weight of the composition. In various embodiments, the amount of the second optional epoxy compound may range from 0 wt % to about 50 wt %, from 0.1 wt % to about 40 wt %; and from 1 wt % to about 30 wt % based on the total weight of the curable composition.

The curable epoxy resin composition may comprise at least one diluent. Non-limiting examples of useful diluent may be a compound having from $C_{12}$-$C_{14}$ carbon atoms; and, diethylene glycol, dipropylene glycol or mixtures thereof. According to U.S. Pat. No. 5,889,084, alcohols, such as ethylene glycol, polyether polyols, diethylene glycol, triethylene glycol, 1,2-propylene glycol, dipropylene glycol, 1,3-butanediol, 1,4-butanediol, neopentyl glycol, trimethylol propane, 1,6-hexanediol, pentaerythritol, trimethylol propane, tetramethylolpropane, dipentaerythritol, dihydroalcohols with a molecular weight of 3000 or less such as polycaprolactone and polytetremethylene oxide, and the like; may be preferred as diluents in that the alcohols will participate in the polymerization and not reduce smear resistance.

Generally, the amount of diluent useful in the curable epoxy resin composition may range from 0 wt % to about 15 wt %. In various embodiments, the amount of the diluent may range from 0 wt % to about 15 wt %, from 0.1 wt % to about 10 wt, from 0.5 wt % to about 8 wt % and from 1 wt % to about 5 wt % based on the total weight of the composition.

The curable epoxy resin composition may further comprise at least one photosensitizer to facilitate the curing of the composition. Non-limiting examples of useful photosensitizers may be polycyclic aromatic compounds, such as anthracene, naphthalene and derivatives thereof, which have long been known for use as sensitizers of iodonium photoinitiators in the cationic ring-opening polymerization of epoxides as described in WO2008139315A2, incorporated herein by reference. (See also, for example, U.S. Pat. No. 6,313,188, EP 0927726, WO 2006/073021, U.S. Pat. Nos. 4,997,717, 6,593,388, and WO 03/076491). For cationically curable ink compositions, non-limiting examples of photosensitizers may be substituted and unsubstituted polynuclear aromatic compounds such as naphthalenes, anthracenes and pyracenes; and substituted and unsubstituted thioxanthones and xanthones as described in Ep1920013B1, incorporated herein by reference. Other examples of photosensitizer may include compounds which sensitize a photo acid generating agent through an electron transfer mechanism or an energy transfer mechanism. Non-limiting examples of these sensitizers may include fused polycyclic aromatic compounds such as anthracene, 9,10-dialkoxyanthracene, 9-hydroxymethylanthracene, pyrene, perylene, aromatic ketone compounds such as acetophenone, benzophenone, thioxanthone, and Michler ketone, and heterocyclic compounds such as phenothiazine and N-aryloxazolidinone; or any combination thereof.

Generally, the amount of photosensitizer useful in the curable epoxy resin composition may range from 0 wt % to about 6 wt %. In various embodiments, the amount of the photosensitizer may range from 0 wt % to about 6 wt %, from 0.01 wt % to about 5 wt %, from 0.1 wt % to about 4 wt %, and from 0.3 wt % to about 3 wt %.

The curable epoxy resin composition may also comprise compounds that are normally used in resin formulations known to those skilled in the art for preparing curable compositions and thermosets. Optional components may added to the composition to enhance application properties (e.g., surface tension modifiers or flow aids), reliability properties (e.g., adhesion promoters) the reaction rate, the selectivity of the reaction, and/or the catalyst lifetime.

The epoxy resin curable composition may comprise at least one modifier. In general, a modifier may be added to the formulation for the purpose of altering the surface tension or haptic properties. Non-limiting examples of modifiers may be BYK 378, BYK 307, and Dow Corning 204SL.

Generally, the amount of the modifier used in the curable composition of the present invention can and will vary depending on the end use of the curable composition. In various embodiments, when a haptic modification is desired, the amount of modifier in the composition may range from 0 wt % to about 4 wt %. In various embodiments, the amount of the modifier may range from 0 wt % to about 4 wt %, from 0.01 wt % to about 2 wt %, and from 0.1 wt % to about 1 wt % based on the weight of the curable composition.

The epoxy resin composition may comprise additional optional compounds. Non-limiting examples of suitable additional optional compounds may be a flexibilizing agent, a processing agent, a toughening agent, and a filler. Generally, the amount of the optional compounds used in the curable composition of the present invention can and will vary depending on the end use of the curable composition. For example, when the curable composition is used to prepare an inkjet ink formulation, the amount of the optional compounds, when used, may range from 0 wt % to about 50 wt %. In various embodiments, the amount of the optional compounds may range from 0 wt % to about 50 wt %, from 0.1 wt % to about 30 wt %, from 0.5 wt % to about 20 wt %, or from 1 wt % to about 10 wt %.

(II) Properties of the Solvent Free, Low Viscosity Curable Composition.

In general, the low viscosity, essentially solvent-free, energy curable composition, before curing, is a liquid. The curable composition exhibits a low viscosity (<50 mPa·s at 25° C.) when the formulation is used in inkjet ink applications. In various embodiments, a low viscosity ink formulation of the present invention generally may exhibit a viscosity at 25° C. of less than or equal to about 50 mPa·s, less than about 40 mPa·s, less than about 30 mPa·s, less than about 20 mPa·s and less than about 10 mPa·s. In other embodiments, the low viscosity composition of the present invention may exhibit a viscosity of greater than about 2 mPa·s, greater than about 4 mPa·s, and greater than about 5 mPa·s. In still another embodiment, the viscosity of the curable composition may exhibit a viscosity of from 2 mPa·s to about 50 mPa·s, from 4 mPa·s to about 40 mPa·s, and from 5 mPa·s to about 30 mPa·s.

In preferred embodiments, the low viscosity, essentially solvent-free, curable composition may be an ink jet curable composition. The low viscosity ink formulation of the present invention can be processed through a wider range of inkjet print-heads including for example piezoelectric in Continuous Ink Jet (CIJ) or Drop-On-Demand (DOD) modes. Ink jet technologies are typically classified in two large classes: Continuous Ink Jet (CIJ) and Drop-on-Demand Ink Jet (DOD). In CIJ, ink may be squirted through nozzles at a constant speed by applying a constant pressure. The jet of ink may be naturally unstable and may break up into droplets shortly after leaving the nozzle. The drops may be left to go to the medium or deflected to a gutter for recirculation depending on the image being printed. The deflection may be achieved by electrically charging the drops when applying an electric field to control the trajectory. The name 'continuous' originates in the fact that drops may be ejected at all times. In DOD ink jet, drops may be ejected only when needed to form the image. The two main drop ejector mechanisms used to generate drops are piezoelectric ink jet (PIJ) and thermal ink jet (TIJ). In PIJ, the volume of an ink chamber inside the nozzle is quickly reduced by means of a piezoelectric actuator, which squeezes the ink droplet out of the nozzle. In TIJ, an electrical heater located inside each nozzle is used to raise the temperature of the ink to the point of bubble nucleation. The explosive expansion of the vapor bubble propels the ink outside the nozzle." Other less common drop generator technologies are also available.

Generally, the average particle size of the colorant particles used in the present invention may range of from about 0.005 µm to about 0.5 µm. In various embodiments, the average particle size of the colorant particles may range from 0.005 µm to about 0.5 µm, from about 0.01 µm to about 0.45 µm, and from about 0.015 µm to about 0.3 µm. In addition, the maximum particle size of the colorant useful may be generally from range from 0.3 µm to about 10 µm, and from about 0.3 µm to about 3 µm. The maximum particle size of the colorant in the above-mentioned range may be achieved by selecting the appropriate colorant, dispersant, and dispersing medium; and setting the appropriate dispersion conditions and filtration conditions. By controlling the particle size, clogging of a head nozzle may be suppressed; and the ink storage stability, the ink transparency, and the curing sensitivity may be maintained. In one embodiment, the particle size of the colorant particles may be such that the particles are capable of being filtered by a conventional filter adapted to filter out particles of 1 micron or more. Therefore, the particle size may be from about 1 nanometer to about 900 nanometers.

In embodiments, the final ink jet ink compositions may exhibit certain physical properties, such as viscosity and surface tension, at levels that may depend on the end use application.

Generally, ink jet ink compositions for use in ink jet recording processes preferably may have a viscosity from about 1 mPa·s to about 100 mPa·s at 25° C. In various embodiments, the viscosity of the ink jet ink compositions may range from 1 mPa·s to about 100 mPa·s at 25° C., and from 2 mPa·s to about 40 mPa·s at 25° C. The surface tension of the ink jet ink composition may be from 20 dynes/cm to about 72 dynes/cm. In various embodiments, the surface tension of the ink jet ink composition may range from 20 dynes/cm to about 72 dynes/cm, from 20 dynes/cm to about 65 dynes/cm, and from 20 dynes/cm to about 60 dynes/cm.

(III) Processes for Preparing a Low Viscosity, Essentially Solvent Free Curable Composition The essentially solvent free, low viscosity, essentially solvent free curable composition may be prepared by forming a reaction mixture comprising (a) at least one divinylarene dioxide compound, (b) at least one cycloaliphatic epoxy resin, (c) at least one vinyl ether compound, (d) at least one cationic photoinitiator, (e) at least pigment, (f) optionally at least one oxetane, and optionally any other desirable additives. Generally, the preparation of the curable resin composition may be achieved by blending, the divinylarene dioxide compound, the cycloaliphatic epoxy resin, and the vinyl ether compound; and then adding the photoinitiator, the pigment, and optionally any other desirable additives in any order. Any of the above-mentioned optional additives may be added to the composition during the mixing or prior to the mixing to form the composition. Optionally, when the cationic photoinitiator is a solid, it may be advantageous to first dissolve cationic photoinitiator in the divinylarene dioxide compound. Optionally, when a photosensitizer is used, it may be advantageous to first dissolve cationic photoinitiator in the component in which it is most soluble. For example, as one illustrative embodiment, when 9,10-diethoxyanthracene is used as a photosensitizer, it is preferentially dissolved in the vinyl ether, preferably butanediol divinyl ether. The solvent free, low viscosity curable composition may be achieved by blending the components in any known mixing equipment or reaction vessel until a homogeneous mixture is obtained. Additionally, the preparation of the curable composition, and/or any of the steps thereof, may be a batch or a continuous process. The mixing equipment used in the process may be any vessel and ancillary equipment well known to those skilled in the art.

All the compounds of the curable formulation are typically mixed and dispersed at a temperature enabling the preparation of an effective UV curable epoxy resin composition having the desired balance of properties for a particular application. In general, the temperature during the mixing of all components may range from 0° C. to about 50° C. In various embodiments, the temperature during the mixing of all the components from 0° C. to about 50° C., from 10° C. to about 40° C., or from 20° C. to about 30° C. In one embodiment, the temperature during the mixing of all the components may be about room temperature (~23° C.). Lower mixing temperatures may help to minimize side reactions and may maximize the pot life of the composition. The mixing may be typically performed under ambient pressure. The reaction may also be conducted under an inert atmosphere, for example, under nitrogen, argon, or helium.

(IV) Process for Preparing a Cured, Solvent Free, Low Viscosity Epoxy Resin Composition Another aspect of the present disclosure provides processes for preparing a cured epoxy resin coating. The processes comprise providing a curable, essentially solvent free, low viscosity epoxy resin composition, which is detailed above, and exposing the curable epoxy resin composition to a curing energy source to form the cured coating. Generally, the curable low viscosity epoxy resin composition is applied to at least a portion of a surface of an article to be coated, prior to subjecting it to an energy source for curing.

(a) A Solvent Free, Low Viscosity Curable Epoxy Resin Composition

Suitable low viscosity curable epoxy resin compositions are described above.

(b) Articles

In a further aspect of the present disclosure encompasses an article comprising a cured or uncured low viscosity epoxy resin composition adhering to at least one portion of the substrate. The article, in broad terms, may be defined as a material wherein the low viscosity, curable epoxy resin composition is initially applied and adheres to at least a portion of at least one surface of the substrate. The curable epoxy resin composition may be cured at a exposing the composition to a curing energy source to form a thermoset or cured composition such that the coating bonds to the substrate. The article may be any material that can withstand the curing energy to form a cured coating.

In various embodiments, the article may be a metal. The article, as defined herein, may be a single metal or an alloy of various metals. Non-limiting examples of these metals include cast iron, aluminum, tin, brass, steel, copper, zinc aluminum alloy, nickel, or combinations thereof.

In other embodiments, the substrate may be a cellulose product. Non-limiting examples of cellulose products may be paper, paperboard, paper cardstock, cardboard, and wood.

In still another embodiment, the substrate may be a plastic. Non-limiting examples of plastics may be bakelite, polyester, polyethylene terephthalate, polyethylene, high density polyethylene, polyvinyl chloride, polyvinylidene chloride, polypropylene, polystyrene, polyamides (Nylon), acrylonitrile butadiene styrene, polycarbonates, polyurethanes, and combinations thereof.

In yet another embodiment, the article may be a fabric or a textile. Non-limiting examples of fabrics may be wool, canvas, cotton, Gore-Tex, hemp, Kevlar, knit, lace, lambswool, leather, linen, neoprene, Nomex, nylon, polyester, rayon, silk, suede, velour, velvet, vinyl coated polyester, and combinations thereof.

In various embodiments, the article may be in various configurations. Non-limiting configuration examples of the article may be a roll, a coil, a plate, a sheet, a tube, or a pipe. The configuration of the article may be of various dimensions, shapes, thicknesses, and weights.

In preferred embodiments, the article may be paper, a fabric, or a textile.

(c) Applying the Low Viscosity, Curable Epoxy Resin Composition

The process further comprises applying the curable epoxy resin composition to a portion of at least one surface of an article. Suitable articles are detailed above. Application of the curable coating composition may be applied through various means. For example, the coating composition may be applied using a drawdown bar, a roller, a knife, a paint brush, a sprayer, dipping, an inkjet device, or other methods known to the skilled artisan. In a preferred embodiment, the coating composition may be applied using an inkjet device (printer). In addition, more than one application of the coating composition may be applied forming a multi-layered coating. As detailed above, the curable coating composition may be applied to one or more surfaces of the article to be coated. One preferred application of these curable epoxy resin composition may be ink jet or an inkjet device. The composition may be loaded into an ink jet cartridge, and then applied to an article.

(d) Curing the Low Viscosity, Curable Epoxy Resin Composition

The process further comprises curing the curable epoxy resin composition to a portion of at least one surface of an article. The low viscosity curable composition, as detailed herein, may be cured by exposing the composition to a curing energy source to form a cured composition or thermoset. These curable compositions may include various coatings and inkjet ink coatings more specifically. By "curing energy" herein it is meant that the composition may be cured by various energy means. For example, the various energy means may include thermal means, electron beam means, and UV means. In inkjet ink applications, for example, a UV curable inkjet ink formulation may be processed in accordance with the procedure described in Hudd, Alan, p. 5, Chemistry of Inkjet inks Edited by: Magdassi, Shlomo© 2010 World Scientific.

The curable composition may be cured using a UV lamp or source with multiple wavelength such as with a metal halide light source or a unique narrow wavelength distribution provided by a light-emitting diode (LED) at a UV wavelength of generally from about 250 nm to about 400 nm.

Generally, the curing energy the curable composition may be chosen between 10 mJ/cm$^2$ to about 1000 mJ/cm$^2$. In various embodiments, the curing energy may be between 10 mJ/cm$^2$ to about 1000 mJ/cm$^2$, between 50 mJ/cm$^2$ to about 800 mJ/cm$^2$, between 75 mJ/cm$^2$ to about 500 mJ/cm$^2$, and between 100 mJ/cm$^2$ to about 300 mJ/cm$^2$.

The cure speed of a curable composition can and will vary depending on the level of photoinitiator used and the level of curing energy to which the curable composition is exposed. High levels of either are undesirable, with the level of photoinitiator generally limited to 5% or less of contained photoinitiator. Faster cure speeds are preferred with cure speeds to a dry surface of generally less than 10 s desired. Cure speed to a surface that does not mar when rubbed can take longer but is generally preferred to be less than 2 minutes (min). Generally, the cure speed for curing the curable composition to a non-marrable finish for photoinitiator levels of 5% or less and energy levels of 250 mJ or less may be between 2 s to about 120 seconds. In various embodiments, the cure speed for the curing the curable composition composition to a non-marrable finish for photoinitiator levels of 5% or less and energy levels of 250 mJ may be between 2 s and 120 s, between 2 seconds to about 60 s, and between about 2 s to about 30 s.

One key element of the curable compositions of the present invention is the ability of the curable composition to cure in the presence of moderate to high atmospheric humidity. The curable compositions of the present invention cure at a relative humidity of greater than 30%; and generally, the composition cures at a relative humidity of at least 70% with an increase in cure time of less than 100% compared to that of less than or equal to 45% relative humidity in one embodiment; the composition cures at a relative humidity of at least 70% with an increase in cure time of less than 60% compared to that of less than or equal to 45% relative humidity in another embodiment; the composition cures at a relative humidity of at least 70% with an increase in cure time of less than 20% compared to that of less than or equal to 45% relative humidity in still another embodiment; and the composition cures at a relative humidity of at least 70% with an increase in cure time of less than 10% compared to that of less than or equal to 45% relative humidity in yet another embodiment.

While not wishing to be limited by theory, the resistance to humidity of the cure rate of the compositions is believed to be related to the ability of the binder portion of the composition, that is the divinylarene dioxide, the cycloaliphatic epoxy resin, the vinyl ether, and the optional liquid components of the composition, not including the pigment, the cationic photoinitiator, and other solid components of the composition, to absorb water from the atmosphere. The ability of the binder portion of the composition to absorb humidity can be measured by the concentration of water in the binder at saturation, or by the sum of the concentrations of water in each binder component at saturation multiplied by the weight fraction of each binder component.

(V) Properties of Cured Epoxy Resin Composition

Another aspect of the present disclosure provides a cured, epoxy resin composition. The UV cured product (i.e., the cross-linked product made from the curable composition) of the present invention shows several improved properties over conventional UV epoxy cured resins. For example, the cured product of the present invention may advantageously have increased pigment content, increased corrosion resistance, water resistance, and greater adhesion to the article. In a specific application of inkjet ink formulations, when the ink formulation is cured as the ink is disposed on the surface of a substrate such as a paper product, the cured product has the following properties such as dry to touch, smear resistance, adhesion, and vibrant color.

The composition of the present invention may be used to provide manufacturing coatings, such as inks, and in particular UV inks; and paints.

The curable composition of the present invention may be used to manufacture a cured thermoset product such as coatings in UV cure applications, adhesives, and marine repair. In another embodiment, the composition may be used to manufacture 3-dimensional objects for rapid prototyping. In one preferred embodiment, the curable composition can be used to prepare UV cure formulations for inks and coatings.

The inkjet ink formulations of the present invention exhibit a combination of properties that deliver a unique readily processable formulation in ink applications.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The "glass transition temperature" ($T_g$) is the temperature at which a polymer transitions from a hard, glassy material to a soft, rubbery material.

The term "acyl," as used herein alone or as part of another group, denotes the moiety formed by removal of the hydroxyl group from the group COOH of an organic carboxylic acid, e.g., RC(O)—, wherein R is $R^1$, $R^1O$—, $R^1R^2N$—, or R'S—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes saturated hydrocarbyl groups that contain from 1 to 30 carbon atoms. They may be linear, branched, or cyclic, may be substituted as defined below, and include methyl, ethyl, propyl, isopropyl, butyl, hexyl, heptyl, octyl, nonyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion.

The term "aryl" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl. Preferably, the aryl group can be phenyl or naphthol and more preferable, phenyl. The term "aromatic" encompasses "aryl" groups defined below. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. They may be straight, branched, or cyclic. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "solventless", "solvent-free", "substantially free of solvent," "essentially free of solvent", "essentially solvent free" or "no solvent" described herein, with reference to a composition, can be used interchangeably and means a composition that has less than about 1 weight percent (wt %) of solvent present in the composition in one embodiment; less than about 1,000 ppm in another embodiment; less than about 500 ppm in still another embodiment; and less than about 100 ppm in yet another embodiment. In another embodiment, "solventless" means a composition in which no solvent is added intentionally in the composition but trace amounts of solvent can be present in the composition. "Trace amounts" herein means an amount in the range of, for example, from about 1 ppm to about 1 wt %.

The term "solvent" described herein means a compound having a boiling point of lower than about 150° C. at 1013 hPa standard atmospheric pressure in one embodiment; lower than about 140° C. in another embodiment; and lower than about 120° C. in still another embodiment. In another embodiment, "solvent", with reference to a composition including a solvent therein, means a compound that volatilizes or evaporates from the composition when a 100 micrometer thick film of the composition is formed at 25° C. and 1013 hPa standard atmospheric pressure for 24 hours (hr).

The terms "volatilize" or "evaporate" described herein means that less than about 20 percent (%) by weight of the solvent compound is left in the film under the above conditions in one embodiment; less than about 10% is left in the film in another embodiment; less than about 5% is left in the film in still another embodiment; and less than about 1% is left in the film in yet another embodiment.

The term "diluent", with reference to a composition including a diluent therein, described herein means a non-volatile compound and a compound which is non-reactive with other compounds in the composition.

The term "low viscosity" described herein, with reference to a composition, means a composition having a viscosity of less than or equal to about 50 mPa·s at 25° C. in one embodiment; less than about 40 mPa·s in another embodiment; less than about 30 mPa·s in still another embodiment; less than about 20 mPa·s in yet another embodiment; and less than about 10 mPa·s in even still another embodiment.

The term "moisture inhibition" described herein, with reference to a composition, means the presence of water mainly in ambient atmosphere, for example, typically from 15% RH to 85% RH at the surface of an ink coating is slowing down the rate of cure by more than about 100% of the original rate of cure of the composition in one embodiment; by more than about 60% of the original rate of cure of the composition in another embodiment; by more than about 50% of the original rate of cure of the composition in still another embodiment; by more than about 20% of the original rate of cure of the composition in yet another embodiment; and by more than about 10% of the original rate of cure of the composition in even still another embodiment.

Having described the invention in detail, it will be apparent that modifications and variations are possible without departing from the scope of the invention defined in the appended claims.

EXAMPLES

The following examples and comparative examples further illustrate the present invention in detail but are not to be construed to limit the scope thereof. Various terms and designations used in the following examples are explained herein below:

"DVBDO" stands for divinylbenzene dioxide and the DVBDO compound used in the examples is a DVBDO compound having a purity of 95%.

"TEGDVE" stands for triethylene glycol divinyl ether and is commercially available from BASF.

"BDDVE" stands for butanediol divinyl ether and is commercially available from BASF.

"Cyclo" stands for the cycloaliphatic epoxy resin Synasia 06E resin which is commercially available from Synasia.

Triarylsulfonium hexafluoroantimonate powder is a photoinitiator used for yellow and black ink colors.

Each one of the following pigments, commercially available from RJA, is delivered as a 25% dispersion in a carrier, either vinyl ether such as TEGDVE or DEGDVE ("carrier-TEGDVE"), or a blend of vinyl ether and cyclo, along with an unknown amount of dispersing agent or as a 25-50% dispersion in cyclo from Penn Color: Cyan: Pigment Blue 15:4: Copper phthalocyanine, Magenta: Pigment Red 122: dimethylquinacridone, Yellow: Pigment Yellow 150: Nickel azo compound, Black: Pigment Black: Carbon black, White: Titanium dioxide. In the following tables the carrier compounds for the pigment are listed after the pigment. The pigment carrier compounds are typically a vinyl ether, an epoxide compound, or a mixture thereof.

The optional oxetanes used in the following examples are bis[1-ethyl(3-oxetanyl)]methyl ether as Aron Oxetane OXT-221, 3-ethyl-3-(2-ethylhexyloxymethyl)oxetane as Aron Oxetane OXT-212, and 3-ethyl-3-hydroxymethyloxetane as Aron Oxetane OXT-101, all of which are commercially available from Toagosei Co., Ltd.

"DEA" stands for 9,10-diethoxyanthracene and is a photosensitizer that is commercially available from Kawasaki Kasei.

The following standard analytical equipments and methods are used in obtaining the experimental values for viscosity and surface tension.

Measurement of Viscosity

The viscosity of the formulation was measured on a stress control rheometer TA Instruments AR2000 equipped with a 60 mm diameter flat stainless steel upper plate and a bottom Peltier plate assembly controlling both the temperature of the liquid sample and the normal force acting on the surface of the Peltier plate. About 0.5 mL of the formulation was deposited on the bottom plate before the top plate was lowered onto the liquid formulation until a gap of 100 microns between the two plates was achieved. The top plate was then rotated at a shear rate of 10 s-1 while the temperature of the bottom plate was maintained at 25° C. Viscosity was automatically calculated by the TA software and reported in Pa·s.

Measurement of the Surface Tension

A Cahn Dynamic Contact Angle Analyzer (Cahn DCA-322) was used to measure the surface tension of the liquid using the Wilhelmy plate method. A thin glass plate which had been cleaned by passing five times through the oxidizing blue flame of a propane torch was lowered into samples of ink. As the vertical plate made contact with the liquid surface (zero depth of immersion), the liquid wet the plate surface upward, expanding the surface area of the liquid and causing the surface tension of the liquid to contract the surface area as a counteraction and immerse the plate downward. This downward force at the zero depth of immersion point was measured during analysis with a microbalance and used to calculate the surface tension (surface tension=(w*g)/(L cos θ), where w=weight at zero depth of immersion, g=gravitational force, L=wetted length of plate, and θ=0 (perfect wetting–zero contact angle)), which is reported as dynes/cm.

Measurement of Cure Speed and Sensitivity to Humidity

Cure speed of the formulations was measured by preparing a drawdown on a clean Mylar sheet. The formulations were cured using a Model DRS-120 adjustable conveyor system equipped with conveyor speed control dial, Epiq brand model 6000 ultraviolet (UV) irradiator module, model P600 power supply for 30 the UV irradiator, and a model H 600 W/in. electrodeless quartz UV lamp that emits radiation in the region 200 nm to 400 nm all from Fusion UV Systems Inc.; model 2100 digital tachometer and model 1017SP surface speed adapter used to measure conveyor speed from Herman H. Sticht Co.; and a Model IL390B radiometer from International Light Technologies.

Using above equipment, the relative humidity was 45% in each example. The cure process speed is indicated by the meters per minute (mpm) of the conveyor. The activated formulations, those incorporating a photosensitizer such as DEA, 9,10-diethoxyanthracene, were cured using a Panasonic Aicure UJ35 with a ANUJ6175 high intensity 385 nanometers (nm) LED and a ANUJ6420 lens which provided a 10 millimeters (mm) diameter cure area at an irradiation distance of 30 mm. Irradiation intensities were set by adjusting the percent power and the time of irradiation. For example, 23% power and 0.5 seconds (s) of irradiation provided 100 milliJules (mJ) of energy, and 23% power with 1.0 s of irradiation provided 200 mJ of energy.

Drawdowns of the formulations were overlaid on a sheet of mylar printed with 10 mm target circles. Prior to irradiating the samples, the LED was activated five times to ensure uniformity in the energy dose. The ink film was then aligned over a fixed target circle underneath the LED and irradiated. Timing started as irradiation began, and the sample was then removed after irradiation was complete and tested by rubbing with a cotton-tipped swab. The end time was set as the time at which the ink film had become dry and hard and no mar could be seen when rubbed firmly with the swab. Initial tests were run at ambient humidity. For high humidity tests, a portable cool vapor humidifier, SPT© SU-1051W, available from Sunpentown International Inc., was placed inside the box enclosing the LED along with a hygrometer to measure the relative humidity. The box openings were covered with plastic curtains. The chamber was humidified and the films were placed inside for 3 minutes (min) to equilibrate. The film was then shielded as the LED was activated five times and then the spot was irradiated. The samples were removed from the chamber for testing with the swab to assess the cure. The absolute difference (Δ) and percentage difference (% Δ) between the cure times at moderate versus high humidity are calculated. The samples were examined for cure over a period of 12 min maximum.

Examples 1-5

General Ink Preparation Procedure

Ink compositions were prepared by weighing a dry photoinitiator into a DVBDO or the other epoxy component. After the photoinitiator dissolved in the DVBDO or other epoxy component, vinyl ethers and cycloaliphatic epoxy were added to the solution of photoinitiator and DVBDO (or other epoxy); and the solution was mixed by shaking. A pigment dispersion was then added to the resulting mixture; and the mixture was made homogeneous by either shaking or rolling for several minutes. When and if the photoinitiator was supplied as a liquid in a carrier such as propylene carbonate, the photoinitiator/carrier was added to the above mixture after the other components but before the pigment dispersion. The inks were then filtered through a 1 micron (μ) glass fiber filter and stored in opaque containers.

As an illustration of the present invention, and not to be limited thereby, the following Table V describes various examples of inkjet ink formulations of the present invention.

TABLE V

| Ingredient | Example 1 | Example 2 | Example 3 | Example 4 | Example 5 |
|---|---|---|---|---|---|
| DVBDO | 20.0% | 20.0% | 20.0% | 20.0% | 20.0% |
| TEGDVE | 0.0% | 0.0% | 0.0% | 4.0% | 16.0% |
| BDDVE | 36.0% | 36.0% | 37.0% | 25.0% | 24.0% |
| Cyclo | 20.0% | 20.0% | 20.0% | 29.0% | 28.0% |
| Pigment type | cyan | magenta | yellow | black | white |
| Pigment | 5.0% | 5.0% | 5.0% | 5.0% | 5.0% |
| Carrier-TEGDVE | 15.0% | 15.0% | 15.0% | 15.0% | 5.0% |
| Irgacure 290 | 4% | 4% | | | |
| CPI 6992 | | | 1.5% | 1% | 1% |
| Propylene Carbonate | | | 1.5% | 1% | 1% |
| Total | 100% | 100% | 100% | 100% | 100% |
| mPa · s | 7.2 | 7.2 | 8.5 | 8.5 | 7 |
| Dynes/cm | 31 | 31 | 31 | 32.5 | 33 |

Examples 6—Comparative Example A-C—Low Viscosity Ink General Ink Preparation Procedure Ink compositions were prepared by weighing a dry photoinitiator and photosensitizer into a vial. BDDVE was added to dissolve the photosensitizer followed by DVBDO or oxetane to aid in dissolving the photoinitiator. After the photoinitiator and photosensitizer were dissolved, cycloaliphatic epoxy and a solution of surfactant in TEGDVE were added and the solution was mixed by shaking. A pigment dispersion in TEGDVE was then added to the resulting mixture; and the mixture was made homogeneous by shaking for 20 s. The inks were then filtered through a 1μ glass fiber filter and stored in opaque containers.

TABLE VI

| 25 cP Cyan Ink | Example 6 | Comparative Example A | Comparative Example B | Comparative Example C |
|---|---|---|---|---|
| DVBDO 95% | 20.10% | | | |
| OXT 221 | | 20% | | |
| OXT 212 | | | 19.90% | |
| OXT 101 | | | | 20.00% |
| BDDVE | 16.00% | 16.00% | 16.00% | 16.00% |
| Syn 6E | 32.90% | 33% | 32.90% | 32.90% |
| D4010PB15:3 | 5.00% | 5.00% | 5.00% | 5.00% |
| TEGDVE | 15.00% | 15.00% | 15.10% | 15.00% |
| T-BYK | 4.00% | 4.00% | 4.00% | 4.00% |
| Irgacure 290 | 5.00% | 5.00% | 5.00% | 5.00% |
| DEA | 5.00% | 5.00% | 5.00% | 5.00% |
| Viscosity | 17.763 | 17.083 | 13.263 | 24.363 |
| 64 m/min, 45% RH | 15 s | 60 s | 16 h+ | 16 h+ |
| 93 m/min, 33% RH | 45 s | 145 s | no cure | no cure |
| LED 100 mJ, 41% RH | 80 s | 390 s | no cure | no cure |
| LED 200 mJ, 36% RH | 25 s | 90 s | no cure | no cure |
| LED 200 mJ, 71% RH | 25 s | 450 s (dry only) | no cure | no cure |
| Δ | 0 | 390 | | |
| % Δ | 0 | 433 | | |

Only the inks made with DVBDO (Example 6) or Oxetane 221 (Comparative Example A) cured well, with the ink made with DVBDO curing faster to give a surface that could not be marred. When subjected to humid conditions, the cure speed of the DVBDO ink (Example 6) was unaffected and achieved a mar-free state, whereas the Oxetane 221 (Comparative Example A) was severely affected, taking much longer to reach a dry state which could still be marred.

Example 7 Comparative Example D-F—Low Viscosity Ink

Ink compositions were prepared by weighing a dry photoinitiator and photosensitizer into a vial. TEGDVE was added to dissolve the photosensitizer followed by DVBDO or oxetane to aid in dissolving the photoinitiator. After the photoinitiator and photosensitizer were dissolved, cycloaliphatic epoxy and a solution of surfactant in TEGDVE were added and the solution was mixed by shaking. A pigment dispersion in TEGDVE was then added to the resulting mixture; and the mixture was made homogeneous by shaking for 20 s. The inks were then filtered through a 1μ glass fiber filter and stored in opaque containers.

TABLE VII

| 25 cP Cyan with TEGDVE | Example 7 | Comparative Example D | Comparative Example E | Comparative Example F |
|---|---|---|---|---|
| DVBDO | 20.00% | | | |
| OXT 221 | | 19.90% | | |
| OXT 212 | | | 20.00% | |
| OXT 101 | | | | 20.00% |
| TEGDVE | 16.00% | 16.00% | 16.00% | 16.00% |
| Syn 6E | 33.00% | 32.90% | 32.90% | 32.90% |
| D4010PB15:3 | 5.00% | 5.00% | 5.00% | 5.00% |
| TEGDVE | 15.00% | 15.10% | 15.00% | 15.00% |
| T-BYK sol | 4.00% | 4.00% | 4.00% | 4.00% |
| Irgacure 290 | 5.00% | 5.10% | 5.00% | 5.00% |
| DEA | 2.00% | 2.00% | 2.00% | 2.00% |
| Viscosity | 27.36 | 24.193 | 17.963 | 3.0913 |
| 91.5 m/min, 33% RH | 65 s | 390 s | no cure | no cure |
| LED 100 mJ, 41% RH | | no cure | no cure | no cure |
| LED 200 mJ, 22% RH | | no cure | no cure | no cure |
| LED 200 mJ, 41% RH | | no cure | no cure | no cure |
| | | no cure | no cure | no cure |
| LED 200 mJ, 77% RH | 50 s | no cure | no cure | no cure |
| Δ | 5 | | | |
| % Δ | 11 | | | |

Only the inks made with DVBDO (Example 7) or Oxetane 221 (Comparative Example D) cured using a metal halide lamp, with the ink made with DVBDO curing faster to give a surface that could not be marred. When irradiated with a 385 nm LED at a power level of 100 mJ, only the DVBDO ink cured in less than 12 min. When irradiated with a 385 nm LED at a power level of 200 mJ, the DVBDO ink cured in 45 s at either 22% or 41% relative humidity. At 77% relative humidity, the DVBDO ink cured in 50 s, almost the same as at lower humidity even though it contained 35% of hydrophilic TEGDVE.

Example 8—Comparative Example G-I—Very Low Viscosity Ink

Ink compositions were prepared by weighing a dry photoinitiator and photosensitizer into a vial. BDDVE was added to dissolve the photosensitizer followed by DVBDO or oxetane to aid in dissolving the photoinitiator. After the photoinitiator and photosensitizer were dissolved, cycloaliphatic epoxy and a solution of surfactant in TEGDVE were added and the solution was mixed by shaking. A pigment dispersion in TEGDVE was then added to the resulting mixture; and the mixture was made homogeneous by shaking for 20 s. The inks were then filtered through a 1μ glass fiber filter and stored in opaque containers.

TABLE VIII

| 10 cP Cyan Ink | Example 8 | Comparative Example G | Comparative Example H | Comparative Example I |
|---|---|---|---|---|
| DVBDO 95% | 20.00% | | | |
| OXT 221 | | 20.10% | | |
| OXT 212 | | | 20.00% | |
| OXT 101 | | | | 20.00% |
| BDDVE | 35.00% | 35.00% | 35.00% | 35.00% |
| Syn 6E | 18.00% | 18.00% | 18.00% | 18.00% |
| D4010PB15:3 | 5.00% | 5.00% | 5.00% | 5.00% |
| TEGDVE | 15.00% | 15.00% | 15.00% | 15.00% |
| T-BYK sol | 0.00% | 0.00% | 0.00% | 0.00% |
| Irgacure 290 | 5.00% | 5.00% | 5.00% | 5.00% |
| DEA | 2.00% | 2.00% | 2.00% | 2.00% |
| Viscosity | 7.878 | 7.536 | 6.038 | 27.763 |
| 97.5 m/min 50% RH | 30 s | 960 s dry | 16 hours+ | 16 hours+ |
| 64 m/min 45% RH | 2 s | 600 s dry | No cure | No cure |
| LED 100 mJ, 43% RH | 25 s | No cure | No cure | No cure |
| LED 100 mJ, 85% RH | 25 s | No cure | No cure | No cure |
| LED 200 mJ, 43% RH | <2 s | 110 s dry | No cure | No cure |
| LED 200 mJ, 73% RH | <2 s | No cure | No cure | No cure |
| Δ | 0 | | | |
| % Δ | 0 | | | |

Only the inks made with DVBDO (Example 8) or Oxetane 221 (Comparative Example G) cured using a metal halide lamp, with only the ink made with DVBDO curing to give a surface that could not be marred. When irradiated with a 385 nm LED at a power level of 100 mJ, only the DVBDO ink cured in less than 12 min. The Oxetane ink (Comp. Example G) was dry after 14 hours (hr) but could still be marred with a cotton swab. When irradiated with a 385 nm LED at a power level of 200 mJ, the DVBDO ink cured much faster than the Oxetane ink, and only the DVBDO ink cured in less than 12 min to a mar-free state. Under high humidity conditions, the cure speed of the ink made with DVBDO was unaffected whether irradiated at 100 mJ or 200 mJ at high humidity. When irradiated under high humidity, the ink made with Oxetane failed to cure.

Example 9—Comparative Example J-L—Very Low Viscosity Ink

Ink compositions were prepared by weighing a dry photoinitiator and photosensitizer into a vial. TEGDVE was added to dissolve the photosensitizer followed by DVBDO or oxetane to aid in dissolving the photoinitiator. After the photoinitiator and photosensitizer were dissolved, cycloaliphatic epoxy and a solution of surfactant in TEGDVE were added and the solution was mixed by shaking. A pigment dispersion in TEGDVE was then added to the resulting mixture; and the mixture was made homogeneous by shaking for 20 s. The inks were then filtered through a 1μ glass fiber filter and stored in opaque containers.

TABLE IX

| 10 cP Cyan Ink | Example 9 | Comparative Example J | Comparative Example K | Comparative Example L |
|---|---|---|---|---|
| DVBDO | 20.00% | | | |
| OXT 221 | | 20.00% | | |
| OXT 212 | | | 20.00% | |
| OXT 101 | | | | 20.00% |
| TEGDVE | 35.00% | 35.00% | 35.00% | 35.00% |
| Syn 6E | 18.00% | 18.00% | 18.00% | 18.00% |
| D4010PB15:3 | 5.00% | 5.00% | 5.00% | 5.00% |
| TEGDVE | 15.00% | 15.00% | 15.00% | 15.00% |
| Irgacure 290 | 5.00% | 5.00% | 5.00% | 5.00% |
| DEA | 2.00% | 2.00% | 2.00% | 2.00% |
| Viscosity mPa·s | 15.13 | 13.473 | 12.423 | 15.813 |
| 91.5 m/min 50% RH | 420 s dry | no cure | no cure | no cure |
| LED 200 mJ, 22% RH | 105 s | no cure | no cure | no cure |
| LED 200 mJ, 43% RH | 90 s dry | no cure | no cure | no cure |
| LED 200 mJ, 76% RH | 160 s | no cure | no cure | no cure |
| Δ | 70 | | | |
| % Δ | 78 | | | |

Only the inks made with DVBDO (Example 9) cured using either a metal halide lamp or a 385 nm LED lamp, achieving a dry film that could still be slightly marred. None of the Oxetane inks cured to dryness. At this level of TEGDVE the viscosity of all inks was above 10 mPa·s. When irradiated with 200 mJ from a 385 nm LED lamp at 22% humidity, the DVBDO ink could be cured to a mar-free finish in 105 s. Raising the humidity to 77%, the same dose of 385 nm light cured slower, taking 160 s to reach a mar-free state. The incorporation of essentially 50% of hydrophilic TEGDVE caused the cure to become sensitive to humidity, although to a far less extent than inks containing oxetane, for example Comparative example A, where a cure speed of 90 s at 36% relative humidity was extended to 450 s at 71% relative humidity.

Examples 10-11—Comparative Example M and N
Low Viscosity Ink and Very Low Viscosity Ink Ink compositions were prepared by weighing a dry photosensitizer into a vial followed by the addition of BDDVE to dissolve the photosensitizer. DVBDO or Oxetane was then added, followed by cycloaliphatic Synasia 06E. To the low viscosity samples, a 1% solution of BYK 378 surfactant in BDDVE was added to adjust the surface tension. A solution of the sulfonium hexafluorophosphate photoinitiator (San Apro 100P) was then mixed in, followed by a pigment dispersion in 1:1 BDDVE/Synasia 06E. The mixtures were made homogeneous by shaking for 20 s, and then filtered through a 1μ glass fiber filter and stored in opaque containers.

TABLE X

| | Low Viscosity | | Very Low Viscosity | |
|---|---|---|---|---|
| Magenta Ink | Example 10 | Comparative Example M | Example 11 | Comparative Example N |
| DVBDO 95% | 20.0% | | 20.1% | |
| OXT 221 | | 20.0% | | 20.1% |
| BDDVE | 17.5% | 17.5% | 36.5% | 36.5% |
| Syn 6E | 30.0% | 30.0% | 15.0% | 15.0% |
| D4110V19 | 5.0% | 5.0% | 5.0% | 5.0% |
| Syn 6E | 7.5% | 7.5% | 7.5% | 7.5% |
| BDDVE | 7.5% | 7.5% | 7.5% | 7.5% |

TABLE X-continued

|  | Low Viscosity | | Very Low Viscosity | |
| --- | --- | --- | --- | --- |
| Magenta Ink | Example 10 | Comparative Example M | Example 11 | Comparative Example N |
| B-BYK sol | 4.1% | 4.1% | 0.0% | 0.0% |
| 100P | 7.0% | 7.0% | 7.0% | 7.0% |
| DEA | 1.5% | 1.5% | 1.5% | 1.5% |
| Total | 100.0% | 100.0% | 100.0% | 100.0% |
| Viscosity | 14.498 | 14.618 | 6.79 | 6.726 |
| 100 mJ, 40% RH | 90 s | 65 s | 45 s | 45 s |
| 100 mJ, 72% RH | 90 s | 140 s | 45 s | 150 s |
| Δ | 0 | 75 | 0 | 95 |
| % Δ | 0 | 115 | 0 | 211 |

The cure speed of the DVBDO ink was unaffected by high humidity, whereas, the oxetane containing ink was greatly affected.

Examples 12-14 and Comparative Example O-P
Low Viscosity Ink, Effect of Increasing Oxetane Ink compositions were prepared by weighing a dry photosensitizer into a vial followed by the addition of BDDVE to dissolve the photosensitizer. DVBDO and/or oxetane was then added, followed by cycloaliphatic Synasia 06E. A 1% solution of BYK 378 surfactant in BDDVE was then added to adjust the surface tension. A solution of the sulfonium hexafluorophosphate photoinitiator (San Apro 100P) was then mixed in, followed by a pigment dispersion in 1:1 BDDVE/Synasia 06E. The mixtures were made homogeneous by shaking for 20 s, and then filtered through a 1μ glass fiber filter and stored in opaque containers.

TABLE XI

| Magenta Ink Low Viscosity | Example 12 | Example 13 | Example 14 | Comparative Example O | Comparative Example P |
| --- | --- | --- | --- | --- | --- |
| DVBDO 95% | 20.0% | 15.0% | 10.1% | 5.0% | |
| OXT 221 | | 5.0% | 10.0% | 15.1% | 20.0% |
| BDDVE | 17.5% | 17.5% | 17.5% | 17.5% | 17.5% |
| Syn 6E | 30.0% | 30.0% | 30.0% | 29.9% | 30.0% |
| D4110V19 | 5.0% | 5.0% | 5.0% | 5.0% | 5.0% |
| Syn 6E | 7.5% | 7.5% | 7.5% | 7.5% | 7.5% |
| BDDVE | 7.5% | 7.5% | 7.5% | 7.5% | 7.5% |
| 1% BYK 378/BDDVE | 4.1% | 4.0% | 4.0% | 4.0% | 4.1% |
| 100P | 7.0% | 7.0% | 7.0% | 7.0% | 7.0% |
| DEA | 1.5% | 1.5% | 1.5% | 1.5% | 1.5% |
| Total | 100.0% | 100.0% | 100.0% | 100.0% | 100.0% |
| Viscosity, mPa · s | 14.498 | 19.65 | 18.98 | 19.68 | 14.618 |
| 100 mJ, 45% RH, | 90 | 85 | 75 | 65 | 65 |
| 100 mJ, 72% RH | 90 | 90 | 140 | 140 | 140 |
| Δ | 0 | 5 | 65 | 65 | 65 |
| % Δ | 0 | 6 | 87 | 100 | 100 |

The low viscosity ink made with only DVBDO (Example 12) exhibited no effect of humidity on cure speed and the ink made with one fourth of the DVBDO substituted with oxetane (Example 13) showed minimal effect on speed. The inks made with increasing levels of oxetane (Comparative examples O and P) exhibited a slight decrease in time required for cure, but were all seriously affected by increased humidity.

Example 15 and Comparative Examples Q-T Very Low Viscosity Ink, Effect of Increasing Oxetane Ink compositions were prepared by weighing a dry photosensitizer into a vial followed by the addition of BDDVE to dissolve the photosensitizer. DVBDO and/or oxetane was then added, followed by cycloaliphatic Synasia 06E. A solution of the sulfonium hexafluorophosphate photoinitiator (San Apro 100P) was then mixed in, followed by a pigment dispersion in 1:1 BDDVE/Synasia 06E. The mixtures were made homogeneous by shaking for 20 s, and then filtered through a 1μ glass fiber filter and stored in opaque containers.

TABLE XII

| Very Low Viscosity Magenta Ink | Example15 | Comparative Example Q | Comparative Example R | Comparative Example S | Comparative Example T |
|---|---|---|---|---|---|
| DVBDO 95% | 20.1% | 15.0% | 10.0% | 5.1% | |
| OXT 221 | | 5.1% | 10.1% | 15.0% | 20.1% |
| BDDVE | 36.5% | 36.4% | 36.4% | 36.4% | 36.5% |
| Syn 6E | 15.0% | 15.0% | 15.0% | 15.0% | 15.0% |
| D4110V19 | 5.0% | 5.0% | 5.0% | 5.0% | 5.0% |
| Syn 6E | 7.5% | 7.5% | 7.5% | 7.5% | 7.5% |
| BDDVE | 7.5% | 7.5% | 7.5% | 7.5% | 7.5% |
| 100P | 7.0% | 7.1% | 7.1% | 7.1% | 7.0% |
| DEA | 1.5% | 1.5% | 1.5% | 1.5% | 1.5% |
| Total | 100.0% | 100.0% | 100.0% | 100.0% | 100.0% |
| Viscosity, mPa·s | 6.79 | 10 | 10.46 | 10.79 | 6.726 |
| 100 mJ, 40% RH, s | 45 | 45 | 45 | 45 | 45 |
| 100 mJ, 72% RH, s | 45 | 90 | 120 | 150 | 150 |
| Δ | 0 | 45 | 75 | 105 | 105 |
| % Δ | 0 | 100 | 167 | 233 | 233 |

The very low viscosity ink made with only DVBDO (Example 15) exhibited no effect of humidity on cure speed, but the ink made with one fourth of the DVBDO substituted with oxetane (Comparative Example Q) showed a decrease in speed at high humidity. The inks made with increasing levels of oxetane (Comparative examples R, S, and T) exhibited a no decrease in time required for cure at low humidity, but were all seriously slowed by increased humidity.

Example 17-20 Very Low Viscosity Ink, Effect of Increasing TEGDVE

Ink compositions were prepared by weighing a dry photosensitizer into a vial followed by the addition of BDDVE to dissolve the photosensitizer. DVBDO and varying amounts of TEGDVE were then added, followed by cycloaliphatic Synasia 06E. A solution of the sulfonium hexafluorophosphate photoinitiator (San Apro 100P) was then mixed in, followed by dispersion of pigment PV19 in 1:1 BDDVE/Synasia 06E. The mixtures were made homogeneous by shaking for 20 s, and then filtered through a 1μ glass fiber filter and stored in opaque containers.

TABLE XIII

| Very Low Viscosity Magenta Ink with TEGDVE | Example 14 | Example 17 | Example 18 | Example 19 | Example 20 |
|---|---|---|---|---|---|
| DVBDO 95% | 20.1% | 20.0% | 20.0% | 20.0% | 20.0% |
| TEGDVE | 0.0% | 15.1% | 18.0% | 21.5% | 24.5% |
| BDDVE | 36.5% | 21.5% | 18.5% | 15.0% | 12.0% |
| Syn 6E | 15.0% | 15.0% | 15.0% | 15.0% | 15.0% |
| D4110V19 | 5.0% | 5.0% | 5.0% | 5.0% | 5.0% |
| Syn 6E | 7.5% | 7.5% | 7.5% | 7.5% | 7.5% |
| BDDVE | 7.5% | 7.5% | 7.5% | 7.5% | 7.5% |
| 100P | 7.0% | 7.0% | 7.0% | 7.0% | 7.0% |
| DEA | 1.5% | 1.5% | 1.5% | 1.5% | 1.5% |
| Total | 100.0% | 100.0% | 100.0% | 100.0% | 100.0% |
| Viscosity | 6.79 | 8.57 | 9.11 | 9.58 | 10.03 |
| 200 mJ, 32% RH | 15 | 60 | 60 | 80 | 140 |
| 200 mJ, 77% RH | 15 | 60 | 60 | 80 | 140 |
| Δ | 0 | 0 | 0 | 0 | 0 |
| % Δ | 0 | 0 | 0 | 0 | 0 |

Although increasing the level of the more hydrophilic TEGDVE in proportion to BDDVE caused a decrease in cure speed, there was no slowing of the cure speed caused by humidity.

Example 2-22 Low Viscosity Ink, Effect of Increasing TEGDVE

Ink compositions were prepared by weighing a dry photosensitizer into a vial followed by the addition of BDDVE and/or the 1% BYK 378 in BDDVE to dissolve the photosensitizer. DVBDO and varying amounts of TEGDVE were then added, followed by cycloaliphatic Synasia 06E. A solution of the sulfonium hexafluorophosphate photoinitiator (San Apro 100P) was then mixed in, followed by a pigment dispersion in 1:1 BDDVE/Synasia 06E. The mixtures were made homogeneous by shaking for 20 s, and then filtered through a 1 micron glass fiber filter and stored in opaque containers. Due to the solubility of the photosensitizer, diethoxyanthracene, it was not possible to make a formulation containing no BDDVE.

TABLE XIV

| Low Viscosity Magenta Ink | Example 12 | Example 21 | Example 22 | Example 23 |
|---|---|---|---|---|
| DVBDO 95% | 20.0% | 20.0% | 20.0% | 20.0% |
| TEGDVE | | 4.1% | 11.6% | 17.6% |
| BDDVE | 17.5% | 13.5% | 6.0% | 0.0% |
| Syn 6E | 30.0% | 30.0% | 30.0% | 30.0% |
| D4110V19 | 5.0% | 5.0% | 5.0% | 5.0% |
| Syn 6E | 7.5% | 7.5% | 7.5% | 7.5% |
| BDDVE | 7.5% | 7.5% | 7.5% | 7.5% |
| B-BYK sol | 4.1% | 4.0% | 4.0% | 4.0% |
| 100P | 7.0% | 7.0% | 7.0% | 7.0% |
| DEA | 1.5% | 1.5% | 1.5% | 1.5% |
| Total | 100.0% | 100.0% | 100.0% | 100.0% |
| Viscosity, mPa·s | 14.498 | 15.19 | 17.81 | 21.23 |
| 200 mJ, 32% RH, s | 25 | 60 | 60 | 65 |
| 200 mJ, 77% RH, s | 25 | 60 | 60 | 100 (dry) |
| Δ | 0 | 0 | 0 | 35 |
| % Δ | 0 | 0 | 0 | 54 |

The low viscosity ink made with no TEGDVE (Example 12) exhibited no effect of humidity on cure speed. Increasing the TEGDVE caused a drop in speed but did not cause an increase in sensitivity to humidity until the sample containing only 4% BDDVE (Example 23) which had exhibited difficulty in dissolving all the photosensitizer.

Example 24-28 Very Low Viscosity Ink, Effect of Increasing DEGDVE

Ink compositions were prepared by weighing a dry photosensitizer into a vial followed by the addition of BDDVE to dissolve the photosensitizer. DVBDO and varying amounts of DEGDVE and BDDVE were then added, followed by cycloaliphatic Synasia 06E. A solution of the sulfonium hexafluorophosphate photoinitiator (San Apro 100P) was then mixed in, followed by a pigment dispersion in 1:1 BDDVE/Synasia 06E. The mixtures were made homogeneous by shaking for 20 s, and then filtered through a 1μ glass fiber filter and stored in opaque containers.

TABLE XV

| Very Low Viscosity Magenta | Example 24 | Example 25 | Example 26 | Example 27 | Example 28 |
|---|---|---|---|---|---|
| DVBDO 95% | 17.8% | 17.9% | 17.8% | 17.8% | 17.4% |
| DEGDVE | 0.0% | 13.4% | 16.1% | 19.3% | 21.3% |
| BDDVE | 32.8% | 19.2% | 16.5% | 13.4% | 13.0% |
| Syn 6E | 13.3% | 13.4% | 13.4% | 13.4% | 13.0% |
| D4110V19 | 4.4% | 4.5% | 4.5% | 4.5% | 4.3% |
| Syn 6E | 6.7% | 6.7% | 6.7% | 6.7% | 6.5% |
| BDDVE | 6.7% | 6.7% | 6.7% | 6.7% | 6.5% |
| BDDVE | 10.7% | 10.7% | 10.7% | 10.7% | 10.4% |
| 100P | 6.3% | 6.3% | 6.3% | 6.3% | 6.% |
| DEA | 1.3% | 1.3% | 1.3% | 1.3% | 1.3% |
| Total | 100.0% | 100.0% | 100.0% | 100.0% | 100.0% |
| Viscosity, mPa·s | 5.287 | 6.1 | 5.765 | 5.596 | 5.85 |
| 200 mJ, 32% RH, s | 40 | 60 | 70 | 70 | 75 |
| 200 mJ, 77% RH, s | 40 | 60 | 70 | 70 | 80 |
| Δ | 0 | 0 | 0 | 0 | 5 |
| % Δ | 0 | 0 | 0 | 0 | 7 |

The low viscosity ink made with only BDDVE (Example 24) exhibited the fastest cure speed. As the level of DEGDVE relative to BDDVE was increased, the inks exhibited a slight decrease in cure speed, but none were seriously affected by increased humidity.

Example 29-31 Low Viscosity Ink, Effect of Increasing DEGDVE

Ink compositions were prepared by weighing a dry photosensitizer into a vial followed by the addition of BDDVE and/or 1% BYK 378 in BDDVE to dissolve the photosensitizer. DVBDO and varying amounts of DEGDVE and BDDVE were then added, followed by cycloaliphatic Synasia 06E. A solution of the sulfonium hexafluorophosphate photoinitiator (San Apro 100P) was then mixed in, followed by a pigment dispersion in 1:1 BDDVE/Synasia 06E. The mixtures were made homogeneous by shaking for 20 s, and then filtered through a 1μ glass fiber filter and stored in opaque containers.

TABLE XVI

| Low Viscosity Magenta Ink | Example 8 | Example 29 | Example 30 | Example 31 |
|---|---|---|---|---|
| DVBDO 95% | 20.0% | 19.9% | 19.9% | 20.0% |
| DEGDVE | 0% | 4.1% | 11.6% | 17.7% |
| BDDVE | 17.5% | 13.6% | 6.1% | 0.0% |
| Syn 6E | 30.0% | 29.9% | 29.9% | 29.9% |
| D4110V19 | 5.0% | 5.0% | 5.0% | 5.0% |
| Syn 6E | 7.5% | 7.5% | 7.5% | 7.5% |
| BDDVE | 7.5% | 7.5% | 7.5% | 7.5% |
| B-BYK sol | 4.1% | 4.0% | 4.0% | 4.0% |
| 100P | 7.0% | 7.0% | 7.0% | 7.0% |
| DEA | 1.5% | 1.5% | 1.5% | 1.5% |
| Total | 100.0% | 100.0% | 100.0% | 100.0% |
| Viscosity, mPa·s | 14.498 | 15.02 | 17.36 | 15.99 |
| 200 mJ, 32% RH, s | 25 | 60 | 80 | 80 |
| 200 mJ, 77% RH, s | 25 | 60 | 80 | 80 |
| Δ | 0 | 0 | 0 | 0 |
| % Δ | 0 | 0 | 0 | 0 |

The low viscosity ink made with only BDDVE (Example 8) exhibited the fastest cure speed. As the level of DEGDVE relative to BDDVE was increased, the inks exhibited a slight decrease in cure speed, but none were affected by increased humidity.

Example 32-33 Low Viscosity Ink with Increased Pigment Load

Ink compositions were prepared by weighing a dry photosensitizer into a vial followed by the addition of BDDVE to dissolve the photosensitizer. DVBDO was then added, followed by cycloaliphatic Synasia 06E. A solution of the sulfonium hexafluorophosphate photoinitiator (San Apro 100P) was then mixed in, followed by a pigment dispersion of magenta pigment PV19 in 1:1 BDDVE/Synasia 06E to make inks containing about 10% and 17% by weight pigment. The mixtures were made homogeneous by shaking for 20 s, and then filtered through a 1 micron glass fiber filter and stored in opaque containers.

TABLE XVII

| High Pigment | Example 32 | Example 33 |
|---|---|---|
| DVBDO | 15.3% | 15.0% |
| BDDVE | 25.9% | 13.9% |

TABLE XVII-continued

| High Pigment | Example 32 | Example 33 |
|---|---|---|
| Syn 06E | 7.8% | |
| D4110PV19 | 9.9% | 16.6% |
| Syn 6E | 14.9% | 21.4% |
| BDDVE | 14.9% | 21.4% |
| 100P | 9.9% | 10.3% |
| DEA | 1.4% | 1.5% |
| Total | 100.0% | 100.0% |
| Viscosity 25° C., mPa·s | 18.5 | 50 |
| Viscosity 40° C., mPa·s | 13 | 34.5 |
| Epoxy level | 38.0% | 36.4% |

Drawdowns of the inks on polyester films were made and could be cured in <10 s with 100 mW from a 385 nm LED. The films exhibited good gloss, hardness and adhesion.

Example 34-41 Low Viscosity Ink with Increased Pigment Load

Ink compositions were prepared by dissolving the dry photoinitiators into vials with DVBDO. After the photoinitiator was dissolved, BDDVE and cycloaliphatic epoxy were added and the solution was mixed by shaking. To adjust the surface tension, a solution of 1% BYK 378 in BDDVE was added. Then, dispersions of pigments in TEGDVE were added to the resulting mixtures, and the mixtures were made homogeneous by shaking for 20 s. The inks were then filtered through a 1μ glass fiber filter and stored in opaque containers.

TABLE XVIII

| High Pigment | Example 34 | Example 35 | Example 36 | Example 37 | Example 38 | Example 39 | Example 40 | Example 41 |
|---|---|---|---|---|---|---|---|---|
| | RJAC | RJAY | RJAM | RJAK | RJAC | RJAY | RJAM | RJAK |
| DVBDO | 24.8% | 24.9% | 24.8% | 24.8% | 24.8% | 24.9% | 25.0% | 25.0% |
| BDDVE | 16.0% | 20.0% | 16.2% | 19.8% | 22.8% | 26.8% | 23.1% | 27.9% |
| ERL 4221 | 7.2% | 7.0% | 7.0% | 8.2% | 0.0% | 0.0% | 0.0% | 0.0% |
| D4010PB154 | 10.0% | | | | 10.0% | | | |
| D4010PY150 | | 10.0% | | | | 10.1% | | |
| D4010PR122 | | | 9.9% | | | | 10.0% | |
| D4010K | | | | 10.0% | | | | 10.0% |
| TEGDVE | 30.0% | 29.9% | 29.8% | 30.0% | 30.0% | 30.2% | 29.9% | 29.9% |
| 1% BYK 378/BDDVE sol | 4.0% | 4.2% | 4.4% | 4.2% | 4.5% | 4.0% | 4.1% | 4.3% |
| Irgacure 290 | 8.0% | | 7.9% | | 7.9% | | 8.0% | |
| Sulf SbF$_6$ | | 4.1% | | 3.0% | | 3.9% | | 3.0% |
| Total | 100.0% | 100.0% | 100.0% | 100.0% | 100.0% | 100.0% | 100.0% | 100.0% |
| Viscosity, mPa·s (25° C.) | 24.5 | 26.62 | 19.9 | 11.2 | 16.07 | 19.81 | 14.2 | 7.68 |
| Epoxy level | 32.0% | 31.9% | 31.9% | 33.0% | 24.8% | 24.9% | 25.0% | 25.0% |

Drawdowns were made of the inks and could be cured with one pass at 30.5 meters per minute through the Fusion UV system. The films exhibited good gloss, hardness and adhesion.

What is claimed is:

1. A low viscosity energy curable epoxy resin composition essentially free of solvent for preparing an ink composition comprising: (a) at least one divinylarene dioxide compound, (b) at least one cycloaliphatic epoxy resin, (c) at least one vinyl ether compound, (d) at least one cationic photoinitiator, and (e) at least colorant compound; wherein (i) the viscosity of the curable composition is less than or equal to about 50 mPa·s at 25° C.

2. The curable epoxy resin composition of claim 1, wherein the composition cures at a relative humidity of greater than 30 percent, and wherein cure time increases less than 100 percent when the composition is cured at a relative humidity of at least 70 percent compared to that of a composition cured at a relative humidity of less than or equal to 45 percent.

3. The curable epoxy resin composition of claim 1, wherein the cure time increases less than 60 percent when the composition is cured at a relative humidity of at least 70 percent compared to that of a composition cured at a relative humidity of less than or equal to 45 percent.

4. The curable epoxy resin composition according to claim 1, further comprising at least one oxetane.

5. The curable epoxy resin composition according to claim 4, wherein the concentration of the oxetane is less than about 15 weight percent when the viscosity of the curable composition is between about 50 mPa·s and about 11 mPa·s at 25° C.

6. The curable epoxy resin composition of claim 4, wherein the concentration of the oxetane is less than about 5 weight percent when the viscosity of the curable composition is less than about 11 mPa·s at 25° C.

7. The curable epoxy resin composition according to claim 1, wherein the curable composition comprises an actinic radiation curable composition.

8. The curable epoxy resin composition according to claim 1, wherein the curable composition comprises a UV curable composition.

9. The curable epoxy resin composition according to claim 1, wherein the at least one divinylarene dioxide is selected from a group comprising one or more substituted divinylbenzene dioxide, divinylnaphthalene dioxide, divinylbiphenyl dioxide, divinyldiphenylether dioxide, and mixtures thereof.

10. The curable epoxy resin composition according to claim 1, wherein the at least one vinyl ether compound is selected from a group comprising a mono vinyl ether, a divinyl ether, a trivinyl ether, or combinations thereof.

11. The curable epoxy resin composition according to claim 1, wherein the at least one cationic photoinitiator is selected from a group consisting of diazonium based photoinitiator, iodonium based photoinitiator, sulfonium based photoinitiator, phosphonium based photoinitiator, and combinations thereof.

12. The curable epoxy resin composition to claim 1, wherein the at least one colorant compound is selected from a group consisting of pigments, dyes, coloring agents, and combinations thereof.

13. The curable epoxy resin composition according to claim 1, including further an epoxide compound other than the divinylarene dioxide or the cycloaliphatic epoxy resin.

14. The curable epoxy resin composition according to claim 1, wherein the concentration of the at least one divinylarene dioxide compound is from about 1 weight percent to about 96 weight percent of the total composition; and wherein the concentration of the at least one cycloaliphatic epoxy resin is from about 1 weight percent to about 80 weight percent of the total composition; wherein the concentration of the at least one vinyl ether compound is from about 1 weight percent to about 96 weight percent of the total composition; and wherein the concentration of the at least one photoinitiator is from about 1 weight percent to about 10 weight percent of the total composition.

15. The curable epoxy resin composition according to claim 1, further comprising at least one photosensitizer.

16. The curable epoxy resin composition according to claim 1, further comprising a filler, a reactive diluent, a flexibilizing agent, a processing aide, a toughening agent, or a mixture thereof.

17. A cured product prepared by curing the curable epoxy resin composition of claim 1.

18. A process for preparing a solvent-free, low viscosity energy curable epoxy resin composition comprising: admixing (a) at least one divinylarene dioxide compound, (b) at least one cycloaliphatic epoxy resin, (c) at least one vinyl ether compound, (d) at least one cationic photoinitiator, (e) at least one pigment, (f) optionally at least one oxetane, and (g) optionally other desirable additives comprising a filler, a reactive diluent, a flexibilizinq agent, a processing aide, a toughening agent, or mixtures thereof.

19. A process for preparing a cured product from a low viscosity energy curable epoxy resin composition, the epoxy resin composition essentially free of solvent and comprising (a) at least one divinylarene dioxide compound, (b) at least one cycloaliphatic epoxy resin, (c) at least one vinyl ether compound, (d) at least one cationic photoinitiator, and (e) at least one colorant compound; wherein (I) the viscosity of the curable composition is less than or equal to about 50 mPa·s at 25° C., the process comprising:
  a. applying the epoxy resin composition on an article;
  b. exposing the epoxy resin composition to a curing energy source forming a cured product.

20. The process according to claim 19, wherein the energy needed to cure the composition ranges between 10 mJ/cm2 and 1000 mJ/cm2; and wherein the composition cures at a relative humidity greater than 30%.

* * * * *